United States Patent
Wei et al.

(10) Patent No.: US 11,791,874 B2
(45) Date of Patent: Oct. 17, 2023

(54) METHOD AND APPARATUS FOR CSI REPORTING IN ELEVATION BEAMFORMING AND FD-MIMO

(71) Applicant: QUALCOMM Incorporated, San Diego, CA (US)

(72) Inventors: Chao Wei, Beijing (CN); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/741,196

(22) PCT Filed: Aug. 14, 2015

(86) PCT No.: PCT/CN2015/086943
§ 371 (c)(1),
(2) Date: Dec. 29, 2017

(87) PCT Pub. No.: WO2017/028007
PCT Pub. Date: Feb. 23, 2017

(65) Prior Publication Data
US 2018/0198497 A1    Jul. 12, 2018

(51) Int. Cl.
*H04B 7/0456* (2017.01)
*H04B 7/06* (2006.01)
*H04W 24/10* (2009.01)

(52) U.S. Cl.
CPC ......... *H04B 7/0469* (2013.01); *H04B 7/0478* (2013.01); *H04B 7/063* (2013.01);
(Continued)

(58) Field of Classification Search
CPC .... H04B 7/0469; H04B 7/0478; H04B 7/063; H04B 7/0639; H04B 7/0626; H04B 7/0632; H04B 7/065; H04W 24/10
See application file for complete search history.

(56) References Cited

U.S. PATENT DOCUMENTS 8,472,536 B2 *  6/2013  Lee ................... H04B 7/0665
                                                    375/260
8,976,839 B2    3/2015  Chen et al.
(Continued)

FOREIGN PATENT DOCUMENTS

CN    102938688 A    2/2013
CN    104184506 A    12/2014
(Continued)

OTHER PUBLICATIONS

3GPP TS 36.213 V12.5.0 (Mar. 2015); 3rd Generation Partnership Project; Technical Specification Group Radio Access Network; Evolved Universal Terrestrial Radio Access (E-UTRA); Physical layer procedures (Release 12) (Year: 2015).*
(Continued)

*Primary Examiner* — Joseph A Bednash
(74) *Attorney, Agent, or Firm* — Holland & Hart LLP

(57) ABSTRACT

Methods, systems, and devices are described for wireless communication. The UE may identify, at a user equipment (UE), a codebook type indicator (CTI) that indicates a codebook among a set of codebooks, such that the codebook may be associated with a two-dimensional antenna port structure of a base station, select a precoding matrix indicator (PMI) based on the CTI, and transmit a channel state information (CSI) report including the PMI. The UE may also receive, at a UE, a first antenna port configuration parameter associated with an antenna port structure of a base station, determine, based on the first antenna port configuration parameter, a second antenna port configuration parameter associated with the antenna port structure, then transmit or receiving data at the UE based on the first antenna port configuration parameter and the second antenna port configuration parameter.

26 Claims, 20 Drawing Sheets

(52) U.S. Cl.
CPC .......... *H04B 7/0639* (2013.01); *H04W 24/10* (2013.01); *H04B 7/065* (2013.01); *H04B 7/0626* (2013.01); *H04B 7/0632* (2013.01)

(56) References Cited

U.S. PATENT DOCUMENTS

| | | | |
|---|---|---|---|
| 9,312,945 B2 | 4/2016 | Park et al. | |
| 2013/0336214 A1* | 12/2013 | Sayana | H04B 7/024 370/328 |
| 2014/0016549 A1* | 1/2014 | Novlan | H04B 7/0417 370/328 |
| 2014/0098689 A1* | 4/2014 | Lee | H04B 7/0639 370/252 |
| 2014/0254701 A1* | 9/2014 | Geirhofer | H04B 7/0478 375/267 |
| 2015/0372740 A1* | 12/2015 | Ko | H04B 7/0469 370/329 |
| 2016/0020846 A1* | 1/2016 | Wang | H04B 7/0456 370/329 |
| 2016/0353290 A1* | 12/2016 | Nammi | H04W 16/26 |

FOREIGN PATENT DOCUMENTS

| | | |
|---|---|---|
| JP | 2015536099 A | 12/2015 |
| JP | 2015536110 A | 12/2015 |
| KR | 101435846 B1 | 8/2014 |
| WO | WO-2014052806 A1 | 4/2014 |
| WO | WO-2014065564 A1 | 5/2014 |
| WO | WO 2014/161166 * 10/2014 ............... H04B 7/06 |
| WO | WO 2014161166 A1 | 10/2014 |
| WO | WO 2014161183 A1 | 10/2014 |

OTHER PUBLICATIONS

3GPP TS 36.213 V 12.5.0 (Mar. 2015), 3rd Generation Partnership Project; Technical Specification Group Radio Access Network; Evolved Universal Terrestrial Radio Access (E-UTRA); Physical Layer Procedures (Release 12); pp. 108-112, Section 7.2.4 (Year: 2015).*
Samsung, "CSI Reporting Types for Rel. 13 FD-MINO", #GPP TSG RAN WG1 Meeting #81, Fukuoka, Japan, May 25-29, 2015, R1-153387 (Year: 2015).*
Supplementary European Search Report—EP15901213—Search Authority—Munich—dated Jun. 25, 2019.
Supplementary Partial European Search Report—EP15901213—Search Authority—Munich—dated Mar. 13, 2019.
ISA/CN, International Search Report and Written Opinion of the International Searching Authority, Int'l. App. No. PCT/CN2015/086943, dated Aug. 14, 2015. State Intellectual Property Office of the P.R. China, Beijing, CN, 75 pgs.
Huawei, et al., "Discussion on Potential Enhancements Related to Non-Precoded CSI-RS based CSI Feedback Scheme", 3GPP TSG RAN WG1 Meeting #81, 3GPP Draft; R1-152485, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015, May 16, 2015 (May 16, 2015), 3 Pages, XP050973031, Retrieved from the Internet: URL: http://www.3gpp.org/ftp/tsg_ran/WG1_RL1/TSGR1_81 /Docs/ [retrieved on May 16, 2015].
Samsung: "Configuration and Control Signaling for Rel. 13 FD-MIMO", R1-153386, 3GPP TSG RAN WG1 Meeting #81, May 29, 2015, Fukuoka, Japan, May 25-29, 2015, 5 pages.
Samsung., et al.,"TP on Codebook Subset Restriction and Reduced Feedback for TR36.897", 3GPP TSG RAN WG1 Meeting #81, R1-153522, Fukuoka, Japan, May 25-29, 2015, pp. 1-2.

* cited by examiner

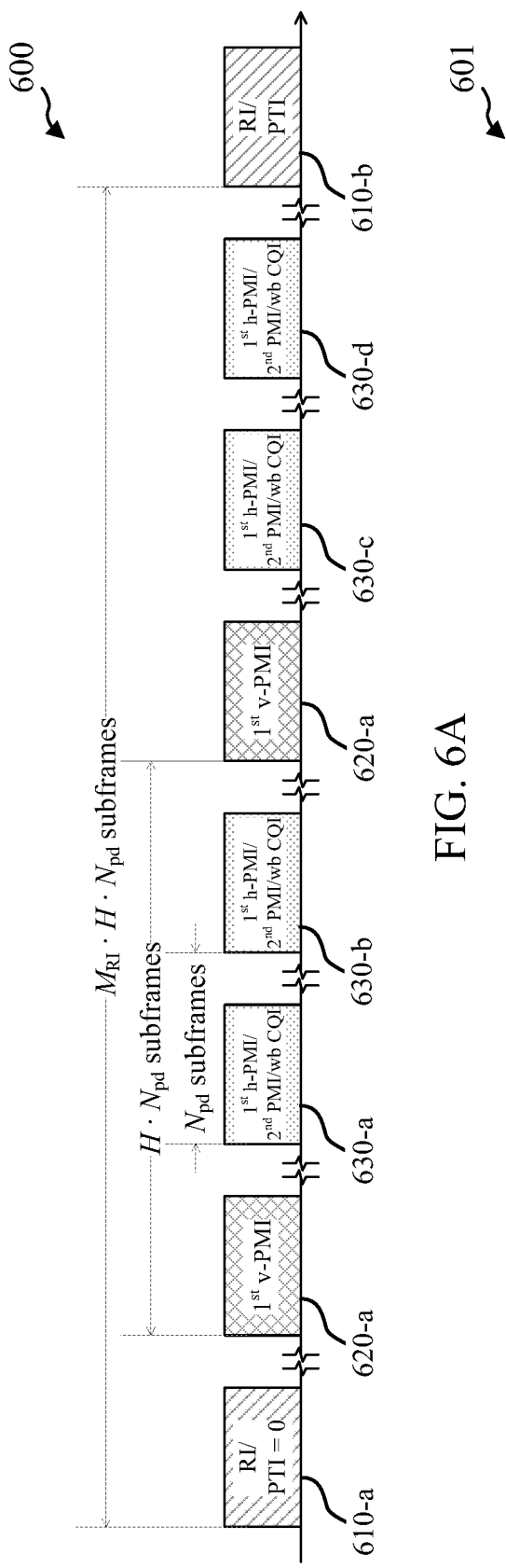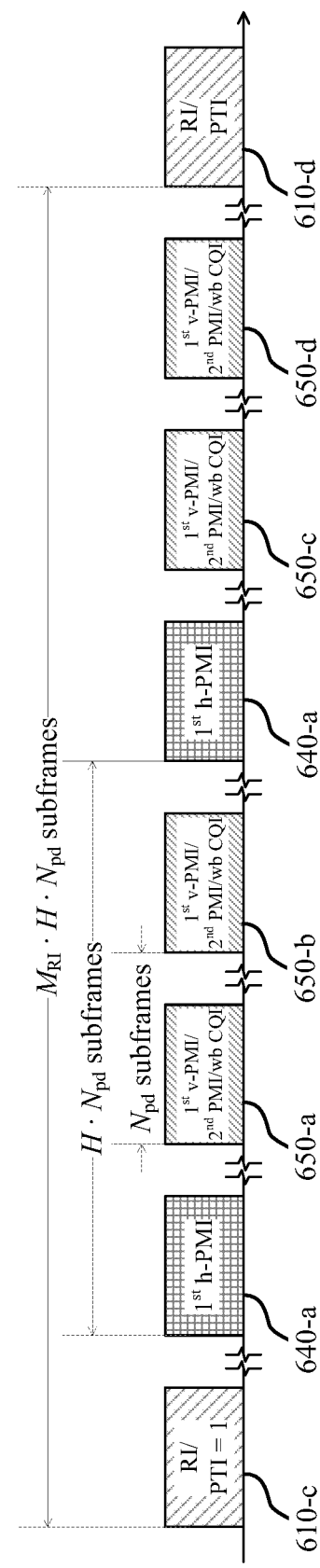
FIG. 6A
FIG. 6B

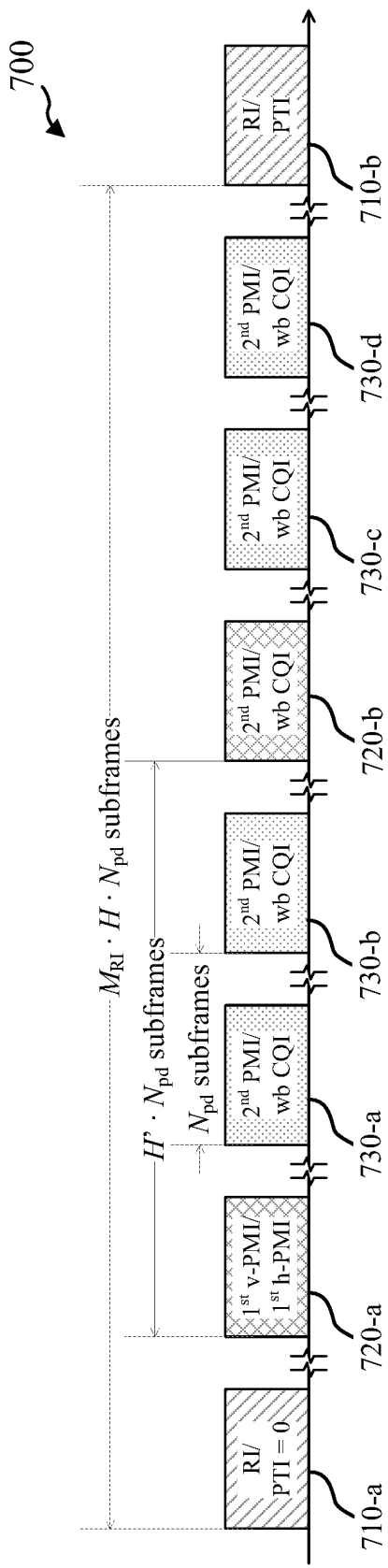
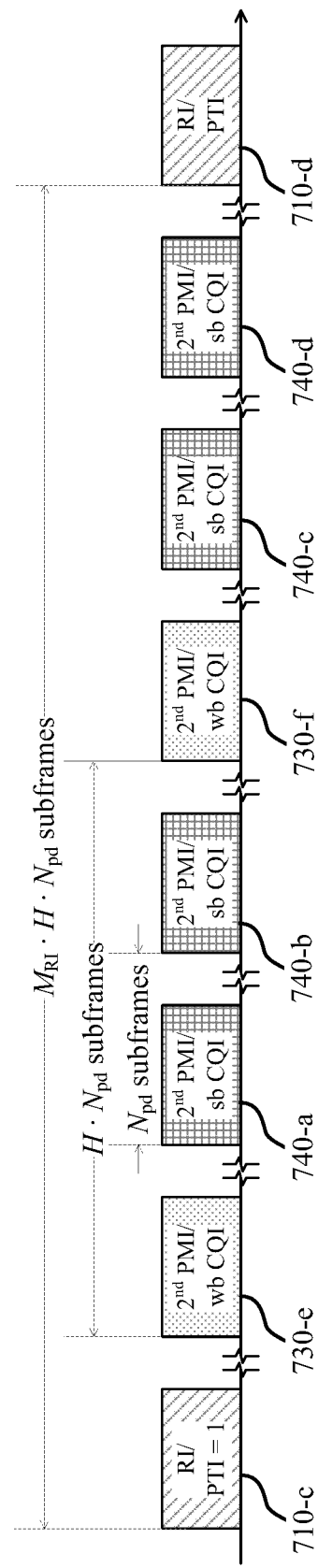
FIG. 7A
FIG. 7B

METHOD AND APPARATUS FOR CSI REPORTING IN ELEVATION BEAMFORMING AND FD-MIMO

BACKGROUND

The present Application for Patent is a 371 national phase of International Patent Application No. PCT/CN2015/086943 by Qualcomm Incorporated et al., entitled "CSI FEEDBACK SIGNALING FOR ELEVATION BEAMFORMING AND FD-MIMO," filed Aug. 14, 2015; which claims priority to International Patent Application No. PCT/CN2015/086943 by Qualcomm incorporated et al., entitled "CSI FEEDBACK SIGNALING FOR ELEVATION BEAMFORMING AND FD-MIMO," filed Aug. 14, 2015 each of which is assigned to the assignee hereof, and expressly incorporated by reference herein.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A base station may communicate with a UE by receiving uplink transmissions from the UE and by sending downlink transmissions to the UE. In certain circumstances, the base station may select a downlink transmission configuration based on a downlink channel condition. The downlink channel condition may be reported to the base station by a UE in the form of a channel state information (CSI) report. The CSI report may include a channel quality indicator (CQI), precoding matrix indicator (PMI), and rank indicator (RI). The combination of the PMI and RI sent to the base station may indicate a precoding matrix selected from a predefined precoder codebook. Predefined codebooks may be associated with one or more antenna ports of a base station, and used for beam forming at the base station.

SUMMARY

Systems, methods, and apparatuses for CSI feedback signaling for elevation beamforming and FD-MIMO are described. The UE may identify, at a user equipment (UE), a codebook type indicator (CTI) that indicates a codebook among a set of codebooks, such that the codebook may be associated with a two-dimensional antenna port structure of a base station. The UE may select a precoding matrix indicator (PMI) based on the CTI. The UE may transmit, from the UE to the base station, a channel state information (CSI) report including the precoding matrix indicator (PMI). In some examples, selecting the PMI based on the CTI includes selecting a first vertical PMI associated with a first vertical codebook. The UE may select a first horizontal PMI associated with a first horizontal codebook. The UE may select a second PMI associated with a second codebook. The UE may restrict a size of one or more of the first vertical codebook or the first horizontal codebook. The UE may aperiodically transmit a set of CSI reports using a physical uplink shared channel (PUSCH). The UE may periodically transmit a set of CSI reports using a physical uplink control channel (PUCCH). The UE may also receive, at a UE, a first antenna port configuration parameter associated with an antenna port structure of a base station. The UE may determine, based on the first antenna port configuration parameter, a second antenna port configuration parameter associated with the antenna port structure. The UE may transmit or receive data at the UE based on the first antenna port configuration parameter and the second antenna port configuration parameter. The UE may receive, at the UE, a third antenna port configuration parameter associated with the antenna port structure, such that determining the second antenna port configuration parameter may be further based on the third antenna port configuration parameter. The UE may transmit or receive the data based on the third antenna port configuration parameter. The first antenna port configuration parameter may be one of a number of rows of the antenna port structure or a number of columns of the antenna port structure. In some examples, the second antenna port configuration parameter includes a polarization arrangement of the antenna port structure.

A method of wireless communication is described. The method may include identifying, at a user equipment (UE), a codebook type indicator (CTI) that indicates a codebook among a set of codebooks, wherein the codebook is associated with a two-dimensional antenna port structure of a base station, selecting a precoding matrix indicator (PMI) based at least in part on the CTI, and transmitting, from the UE to the base station, a channel state information (CSI) report including the PMI.

An apparatus for wireless communication is described. The apparatus may include means for identifying, at a user equipment (UE), a codebook type indicator (CTI) that indicates a codebook among a set of codebooks, wherein the codebook is associated with a two-dimensional antenna port structure of a base station, means for selecting a precoding matrix indicator (PMI) based at least in part on the CTI, and means for transmitting, from the UE to the base station, a channel state information (CSI) report including the PMI.

A further apparatus for wireless communication is described. The apparatus may include a processor, memory in electronic communication with the processor, and instructions stored in the memory and operable, when executed by the processor, to cause the apparatus to identify, at a user equipment (UE), a codebook type indicator (CTI) that indicates a codebook among a set of codebooks, wherein the codebook is associated with a two-dimensional antenna port structure of a base station, select a precoding matrix indicator (PMI) based at least in part on the CTI, and transmit, from the UE to the base station, a channel state information (CSI) report including the PMI.

A non-transitory computer-readable medium storing code for wireless communication is described. The code may include instructions executable to identify, at a user equipment (UE), a codebook type indicator (CTI) that indicates a codebook among a set of codebooks, wherein the codebook is associated with a two-dimensional antenna port structure of a base station, select a precoding matrix indicator (PMI) based at least in part on the CTI, and transmit, from the UE to the base station, a channel state information (CSI) report including the PMI.

A further method of wireless communication is described. The method may include receiving, at a UE, a first antenna port configuration parameter associated with an antenna port structure of a base station, determining, based at least in part on the first antenna port configuration parameter, a second antenna port configuration parameter associated with the antenna port structure, and transmitting or receiving data at the UE based at least in part on the first antenna port configuration parameter and the second antenna port configuration parameter.

A further apparatus for wireless communication is described. The apparatus may include means for receiving, at a UE, a first antenna port configuration parameter associated with an antenna port structure of a base station, means for determining, based at least in part on the first antenna port configuration parameter, a second antenna port configuration parameter associated with the antenna port structure, and means for transmitting or receiving data at the UE based at least in part on the first antenna port configuration parameter and the second antenna port configuration parameter.

A further apparatus for wireless communication is described. The apparatus may include a processor, memory in electronic communication with the processor, and instructions stored in the memory and operable, when executed by the processor, to cause the apparatus to receive, at a UE, a first antenna port configuration parameter associated with an antenna port structure of a base station, determine, based at least in part on the first antenna port configuration parameter, a second antenna port configuration parameter associated with the antenna port structure, and transmit or receiving data at the UE based at least in part on the first antenna port configuration parameter and the second antenna port configuration parameter.

A further non-transitory computer-readable medium storing code for wireless communication is described. The code may include instructions executable to receive, at a UE, a first antenna port configuration parameter associated with an antenna port structure of a base station, determine, based at least in part on the first antenna port configuration parameter, a second antenna port configuration parameter associated with the antenna port structure, and transmit or receiving data at the UE based at least in part on the first antenna port configuration parameter and the second antenna port configuration parameter.

Some examples of the method, apparatuses, or non-transitory computer-readable medium described herein may further include processes, features, means, or instructions for receiving, at the UE, a third antenna port configuration parameter associated with the antenna port structure, wherein determining the second antenna port configuration parameter is further based at least in part on the third antenna port configuration parameter, and transmitting or receiving the data is further based at least in part on the third antenna port configuration parameter. Additionally or alternatively, some examples may include processes, features, means, or instructions where the first antenna port configuration parameter includes a number of rows of the antenna port structure, the second antenna port configuration parameter includes a number of polarizations of the antenna port structure, and the third antenna port configuration parameter includes a number of columns of the antenna port structure.

Some examples of the methods, apparatuses, or non-transitory computer-readable media described herein may include wherein the CSI report further includes the CTI.

Some examples of the methods, apparatuses, or non-transitory computer-readable media described herein may include selecting the PMI based at least in part on the CTI, including selecting a first vertical PMI associated with a first vertical codebook, selecting a first horizontal PMI associated with a first horizontal codebook, and selecting a second PMI associated with a second codebook.

Some examples of the methods, apparatuses, or non-transitory computer-readable media described herein may include one or more of selecting the first vertical PMI, selecting the first horizontal PMI, or selecting the second PMI is based at least in part on the CTI.

Some examples of the methods, apparatuses, or non-transitory computer-readable media described herein may include a codebook including a first vertical codebook associated with a number of rows of the two-dimensional antenna port structure, and wherein a first horizontal codebook associated with a number of columns of the two-dimensional antenna port structure.

Some examples of the methods, apparatuses, or non-transitory computer-readable media described herein may include a codebook further including a second codebook associated with a number of polarizations of the two-dimensional antenna port structure.

Some examples of the methods, apparatuses, or non-transitory computer-readable media described herein may include restricting a size of one or more of the first vertical codebook or the first horizontal codebook.

Some examples of the methods, apparatuses, or non-transitory computer-readable media described herein may include receiving, at the UE, a bitmap parameter associated with a restricted codebook size to be applied to the one or more of the first vertical codebook or the first horizontal codebook when restricting the size.

Some examples of the methods, apparatuses, or non-transitory computer-readable media described herein may include selecting the PMI further based at least in part on a rank indicator (RI).

Some examples of the methods, apparatuses, or non-transitory computer-readable media described herein may include aperiodically transmitting a plurality of CSI reports using a physical uplink shared channel (PUSCH).

In some examples of the method, apparatuses, or non-transitory computer-readable medium described herein, aperiodically transmitting the plurality of CSI reports using the physical uplink shared channel (PUSCH) includes aperiodically transmitting the CTI, a rank indicator (RI), a first vertical PMI, a first horizontal PMI, and a CQI. Additionally or alternatively, some examples may include processes, features, means, or instructions for periodically transmitting a plurality of CSI reports using a physical uplink control channel (PUCCH).

In some examples of the method, apparatuses, or non-transitory computer-readable medium described herein, periodically transmitting the plurality of CSI reports using the physical uplink control channel (PUCCH) includes transmitting, with a first periodicity, a first CSI report encoding a rank indicator (RI) and a first vertical PMI, transmitting, with a second periodicity, a second CSI report encoding a first horizontal PMI, and transmitting, with a third periodicity, a third CSI report encoding a wideband channel quality indicator (CQI) and a second PMI.

In some examples of the method, apparatuses, or non-transitory computer-readable medium described herein, periodically transmitting the plurality of CSI reports using the PUCCH includes transmitting, with a first periodicity, a first CSI report encoding a rank indicator (RI) and a precoding type indicator (PTI), transmitting, with a second periodicity, a second CSI report encoding one of a first vertical PMI or a first horizontal PMI based at least in part on the PTI, and transmitting, with a third periodicity, a third CSI report encoding a wideband channel quality indicator (CQI), a second PMI, and one of the first horizontal PMI or the first vertical PMI based at least in part on the PTI.

In some examples of the method, apparatuses, or non-transitory computer-readable medium described herein, periodically transmitting the plurality of CSI reports using the PUCCH includes transmitting, with a first periodicity, a first CSI report encoding a rank indicator (RI) and a precoding type indicator (PTI), transmitting, with a second periodicity, a second CSI report encoding, based at least in part on the PTI, one of a combined first horizontal PMI and first vertical PMI or a combined wideband channel quality indicator (CQI) and a second PMI, and transmitting, with a third periodicity, a third CSI report encoding, based at least in part on the PTI, one of a combined wideband CQI and a second PMI or a combined subband CQI and the second PMI.

In some examples of the method, apparatuses, or non-transitory computer-readable medium described herein, transmitting the CSI report includes detecting a collision between the CSI report associated with the base station and a second CSI report, determining that a first priority associated with the CSI report is higher than a second priority associated with the second CSI report, dropping the second CSI report, and transmitting, from the UE to the base station, the CSI report including the PMI.

Some examples of the method, apparatuses, or non-transitory computer-readable medium described herein may further include processes, features, means, or instructions for receiving, at the UE, a third antenna port configuration parameter associated with the antenna port structure, wherein determining the second antenna port configuration parameter is further based at least in part on the third antenna port configuration parameter, and transmitting or receiving the data is further based at least in part on the third antenna port configuration parameter. Additionally or alternatively, some examples may include processes, features, means, or instructions where the first antenna port configuration parameter includes a number of rows of the antenna port structure, the second antenna port configuration parameter includes a number of polarizations of the antenna port structure, and the third antenna port configuration parameter includes a number of columns of the antenna port structure.

Some examples of the method, apparatuses, or non-transitory computer-readable medium described herein may further include processes, features, means, or instructions where the first antenna port configuration parameter is one of a number of rows of the antenna port structure or a number of columns of the antenna port structure, and the second antenna port configuration parameter includes a polarization arrangement of the antenna port structure. Additionally or alternatively, some examples may include processes, features, means, or instructions for determining the second antenna port configuration parameter is based at least in part on the first antenna port configuration parameter and a third antenna port configuration parameter of the antenna port structure.

In some examples of the method, apparatuses, or non-transitory computer-readable medium described herein, the antenna port structure comprises a cross-polarized two-dimensional antenna port structure.

BRIEF DESCRIPTION OF THE DRAWINGS

Aspects of the disclosure are described in reference to the following figures:

FIGS. 6A and 6B illustrate examples of signal flows for CSI feedback signaling for elevation beamforming and FD-MIMO in accordance with various aspects of the present disclosure;

FIGS. 7A and 7B illustrate examples of signal flows for CSI feedback signaling for elevation beamforming and FD-MIMO in accordance with various aspects of the present disclosure;

DETAILED DESCRIPTION

Figure 1:
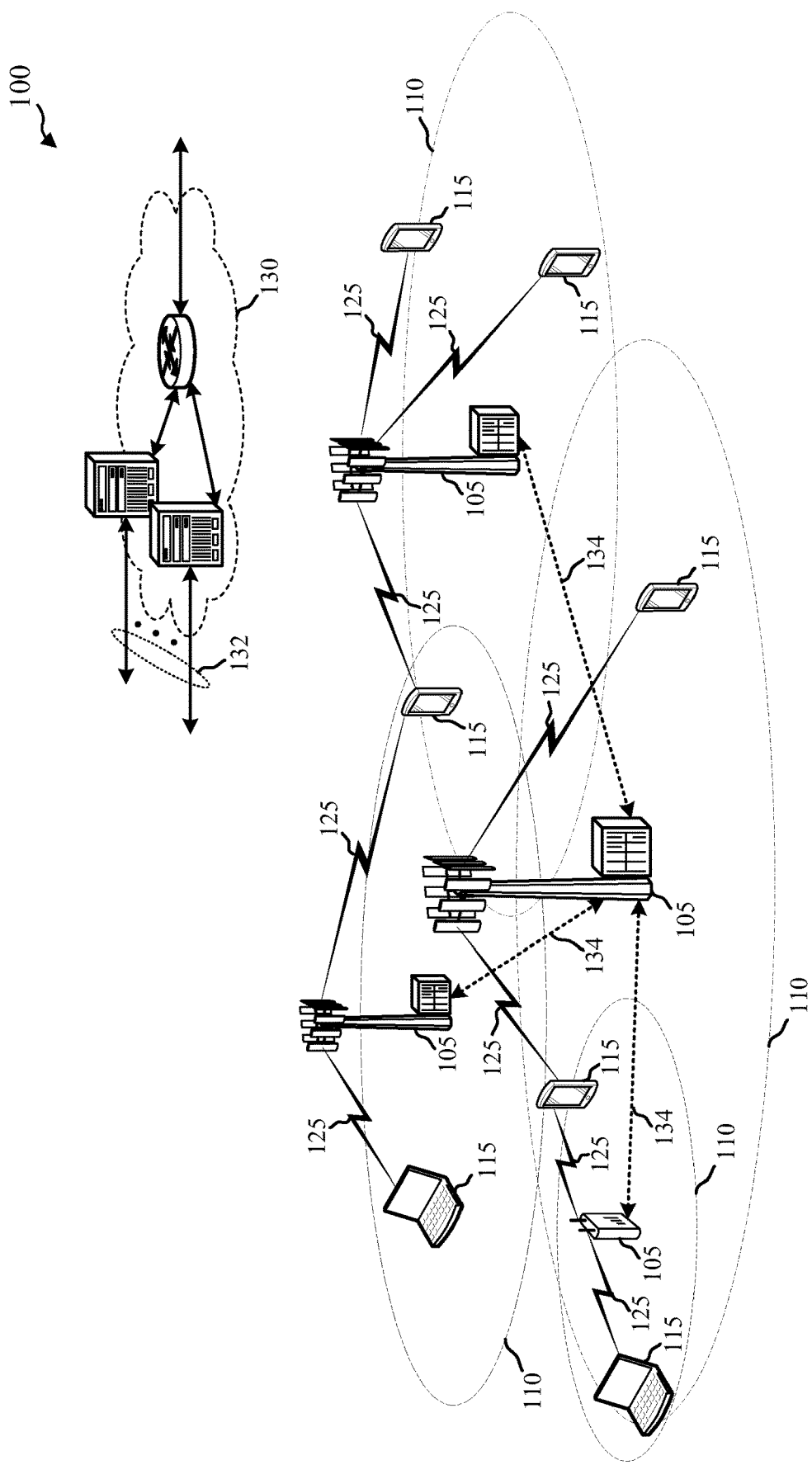
FIG. 1 illustrates an example of a wireless communications system that supports channel state information (CSI) feedback signaling for elevation beamforming and FD-MIMO in accordance with various aspects of the present disclosure.

Some wireless communications systems may use beamforming. Beamforming (which may also be referred to as spatial filtering) is a signal processing technique that may be used at a transmitter (e.g. a base station) to shape and/or steer an overall antenna beam in the direction of a target receiver (e.g. a user equipment (UE)). This may be achieved by combining elements in a array in such a way that transmitted signals at particular angles experience constructive interference while others experience destructive interference. Multiple-input multiple-output (MIMO) wireless systems use a transmission scheme between a transmitter (e.g.

a base station) and a receiver (e.g. a UE), where both transmitter and receiver are equipped with multiple antennas. Many MIMO systems consider the azimuth dimension of the three-dimensional (3D) multipath propagation of signals. However, gains in interference avoidance may be achieved by dynamic beam steering in the elevation (or vertical) dimension as well. A MIMO wireless system using beamforming in both the azimuth and elevation dimensions may be referred to as full-dimension MIMO (FD-MIMO). A MIMO wireless system may use a two-dimensional (2D)

active-antenna array (AAA) that has an elevation dimension. The elevation dimension may be used for beam steering in the elevation dimension to improve data capacity. A 2D AAA may accommodate more antenna ports than a one-dimensional (1D) antenna array.

A base station may communicate with a user equipment (UE) by receiving uplink transmissions from the UE and by sending downlink transmissions to the UE. In certain circumstances, the base station may select a downlink transmission configuration based on a downlink channel condition. The downlink channel condition may be reported to the base station by a UE in the form of a channel state information (CSI) report. A UE may report CSI data to the base station periodically or in response to specific requests from the base station (e.g., aperiodically). The CSI information may be transmitted from the UE to the base station in a CSI report, for example via a physical uplink control channel (PUCCH) and/or a physical uplink shared channel (PUSCH). The CSI report may include a channel quality indicator (CQI), precoding matrix indicator (PMI), and rank indicator (RI). The combination of the PMI and RI sent to the base station may indicate a precoding matrix selected from a predefined precoder codebook. In order for the base station to use the elevation (or vertical) dimension in elevation beamforming (EBF) or for FD-MIMO, the base station needs to receive CSI information from the UE (or mobile station) to which the base station is transmitting regarding both the elevation dimension and the azimuth dimension. The predefined codebooks may be associated with a number of antenna ports of a base station. However, many codebooks are optimized for 1D antennas, and may not function optimally for 2D antenna to be used for EBF and/or FD-MIMO. In addition, such codebooks may be optimized for antenna arrays with certain numbers of antenna ports, while EBF and/or FD-MIMO may use a greater number of antenna ports. For example, some existing codebooks are optimized for eight or fewer antenna ports, and are not optimized for antenna arrays using a greater number of antenna ports, e.g. sixteen (16) antenna ports.

Aspects of the disclosure are initially described in the context of a wireless communication system. Specific examples are then described. These and other aspects of the disclosure are further illustrated by and described with reference to apparatus diagrams, system diagrams, and flowcharts that relate to channel state information (CSI) feedback signaling for elevation beamforming and full-dimension multiple-input multiple-output (FD-MIMO).

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-advanced (LTE-a) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A UE 115 may be configured to collaboratively communicate with multiple evolved node B (eNBs) 105 through, for example, Multiple Input Multiple Output (MIMO), Coordinated Multi-Point (CoMP), or other schemes. multiple input multiple output (MIMO) techniques use multiple antennas on the base stations or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization.

PUCCH may be used for uplink (UL) acknowledgements (ACKs), scheduling requests (SRs) and channel quality indicators (CQI) and other UL control information. A physical uplink control channel (PUCCH) may be mapped to a control channel defined by a code and two consecutive resource blocks. UL control signaling may depend on the presence of timing synchronization for a cell. PUCCH resources for scheduling request (SR) and channel quality indicator (CQI) reporting may be assigned (and revoked) through radio resource control (RRC) signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

A base station 105 may gather channel condition information from a UE 115 in order to efficiently configure and schedule the channel. This information may be sent from the UE 115 in the form of a channel state report. A channel state report may contain a rank indicator (RI) requesting a number of layers to be used for downlink (DL) transmissions (e.g., based on the antenna ports of the UE 115), a precoding matrix indicator (PMI) indicating a preference for which precoder matrix should be used (based on the number of layers), and a CQI representing the highest modulation and coding scheme (MCS) that may be used. CQI may be calculated by a UE 115 after receiving predetermined pilot symbols such as cell-specific reference signals (CRS) or CSI-RS. RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

Some portions of wireless communications system 100 may use beamforming. For example, base station 105 may have an antenna array with a number of rows and columns of antenna ports that the base station 105 may use for beamforming in its communication with UE 115. Base station 105 may configure UE 115 via higher-level signaling with information concerning the antenna port structure that the base station 105 is to use to communicate with UE 115. During subsequent communications, as UE 115 receives data from base station 105, UE 115 may report CSI information to base station 105 via communication link 125 in CSI reports so that the base station 105 may use EBF and FD-MIMO. The CSI reports may be sent via a PUCCH and/or a PUSCH, periodically or aperiodically, as UE 115 communicates with base station 105. CSI information that may be transmitted in the CSI report when taking into account the elevation dimension for EBF and FD-MIMO may include one or more of a CQI (wideband and/or subband), a PMI for the vertical dimension ($1^{st}$ v-PMI), a PMI for the horizontal dimension ($1^{st}$ h-PMI), PMI indicating a beam selection (and cross-polarization co-phasing in some circumstances) ($2^{nd}$ PMI), and a rank indicator (RI) for the beam. As further discussed below, different CSI report may be used to report different CSI information at different times, and certain components of the CSI information may be reported more or less frequently than other components of the CSI information.

Figure 2:
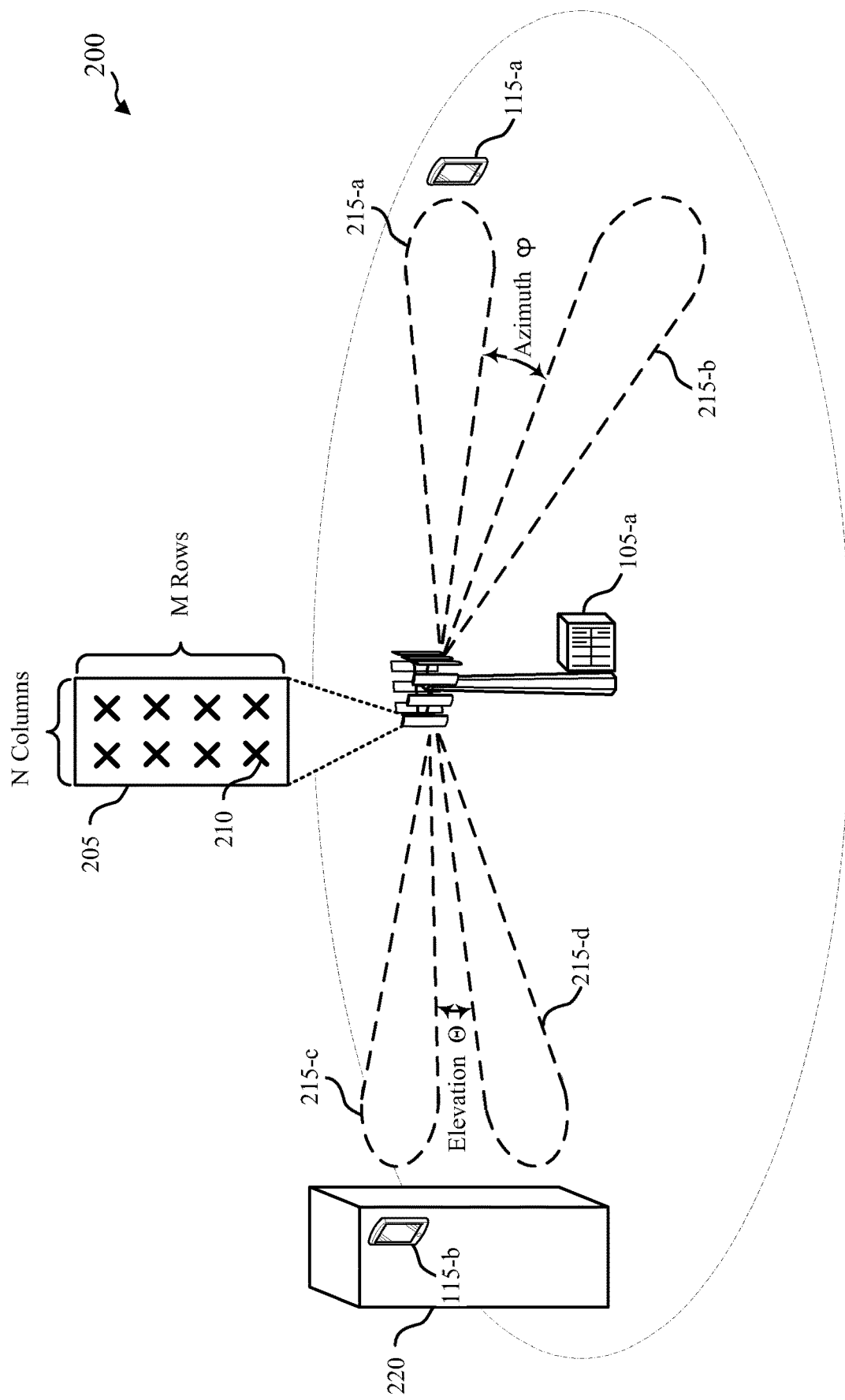
FIG. 2 illustrates an example of a wireless communications subsystem that supports CSI feedback signaling for elevation beamforming and FD-MIMO in accordance with various aspects of the present disclosure.

FIG. 2 illustrates an example of a wireless communications subsystem 200 for CSI feedback signaling for elevation beamforming and FD-MIMO in accordance with various aspects of the present disclosure. Wireless communications subsystem 200 may include UE 115-a, UE 115-b, UE 115-c, UE 115-d, and base station 105-a, which may be examples of a UE 115 and base station 105 described with reference to FIG. 1. Base station 105-a may use an antenna array 205 using a number of antennas 210. As shown for antenna array 205, each of antennas 210 may correspond to one of two cross-polarized antennas. Where antenna array 205 uses a matrix of cross-polarized antennas for antennas 210 in an antenna port structure (APS), antenna array 205 may have M rows of cross-polarized antennas and N columns of cross-polarized antennas in an M×N structure. In an example, antenna array 205 may have an APS that has sixteen ports in a 4×2 APS, which may be an example of a 2D AAA.

Base station 105-a may use antenna array 205 to direct beam 215 toward UE 115-a using azimuth beamforming. Beam 215 may be directed azimuthally, including toward UE 115-a as beam 215-a, or at an azimuth angle □ relative to beam 215-a as beam 215-b. For example, if UE 115-a moves azimuthally, base station 105-a may be notified via one or more CSI reports from UE 115-a and beam 215 directed as illustrated by beam 215-b toward a new position of UE 115-a.

According to the various aspects described herein, base station 105-a may also use antenna array 205 to direct a beam 215 toward a UE 115 using elevation beamforming. Beam 215 may be directed in the elevation dimension, including toward UE 115-b as beam 215-c, or at an elevation angle Θ relative to beam 215-c as beam 215-d. For example, if UE 115-a moves in the elevation dimension, for example vertically within a building, base station 105-a may be notified via one or more CSI reports from UE 115-b and beam 215 directed as illustrated by beam 215-d toward the new position of UE 115-b.

Figure 3:
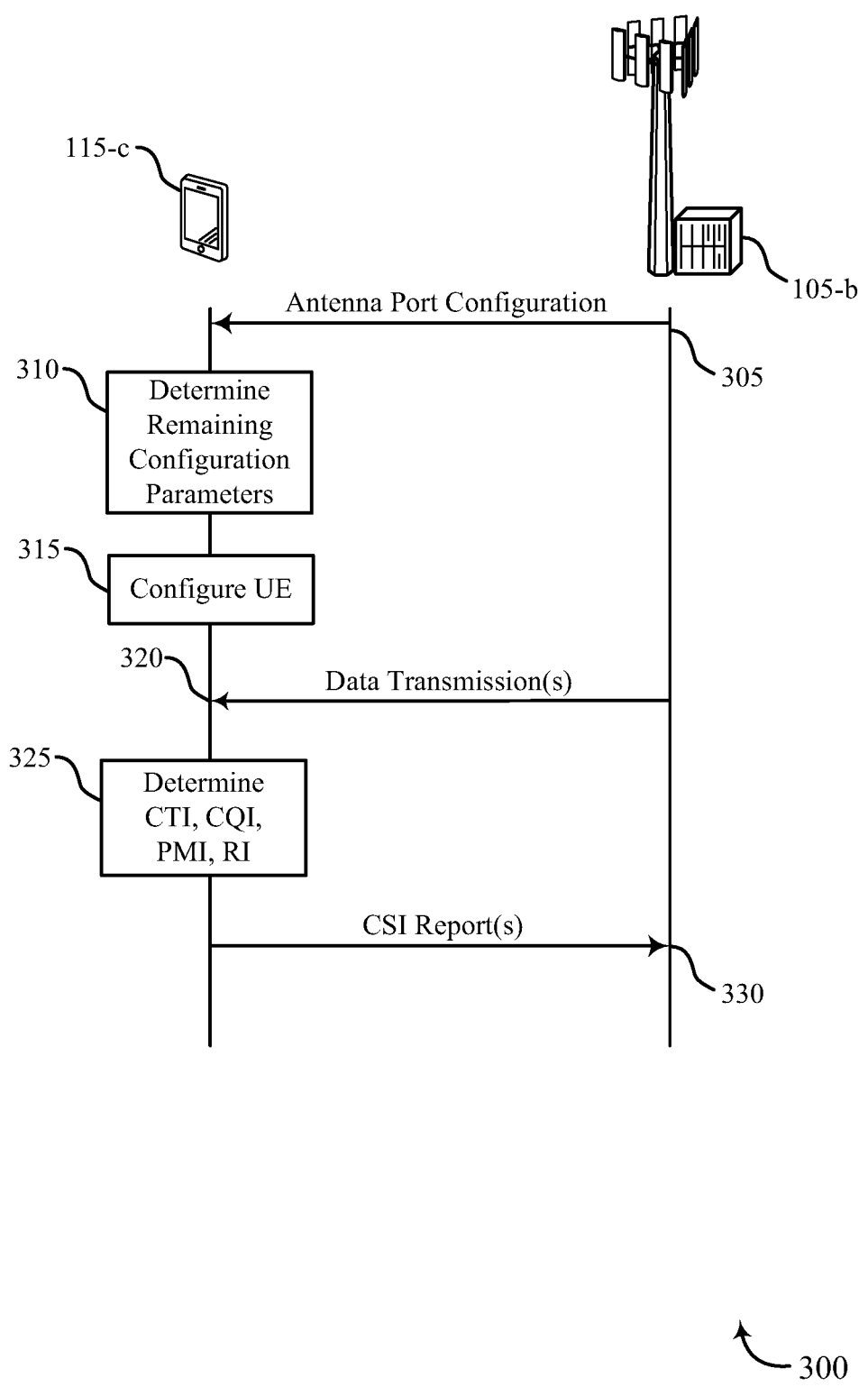
FIG. 3 illustrates an example of antenna port configuration flow diagram for CSI feedback signaling for elevation beamforming and FD-MIMO in accordance with various aspects of the present disclosure.

FIG. 3 illustrates an example of antenna port configuration flow diagram 300 for CSI feedback signaling for elevation beamforming and FD-MIMO in accordance with various aspects of the present disclosure. Flow diagram 300 may include a UE 115-c and base station 105-b, which may be examples of a UE 115 and base station 105 described with reference to FIGS. 1-2. Base station 105-b may configure UE 115-c with an antenna port structure (APS) of base station 105-b so that UE 115-c may operate consistent with EBF and FD-MIMO. Base station 105-b transmits, via higher-layer signaling, an antenna port configuration message 305 to UE 115-c containing information regarding the APS. The antenna port configuration message 305 may indicate a number of APS configuration parameters, include the number of rows (114) of antenna ports, the number of columns (N) of antenna ports, and/or the number of polarizations (P) of the antenna ports. For the number of polarizations, an indicator of "1" may indicate that the antenna ports are co-polarized, while an indicator of "0" may indicate that the antenna ports are cross polarized, for example as show for antenna array 205 in FIG. 2. At block 310, UE 115-c may use the APS configuration information included in antenna port configuration message 305 to determine the remaining configuration parameters, if any, for the APS that have not been explicitly communicated by base station 105-b in the antenna configuration message 305. Based on the APS configuration parameters explicitly communicated as well as the implicitly-determined APS configuration parameters, UE 115-c may then be configured according to the APS at block 315. Once configured for the APS of base station 105-b, UE 115-c may then transmit data transmissions 320 to and receive data transmissions 320 from base station 105-b.

In one example of the antenna port configuration message 305, each of the APS configuration parameters (M, N, and P) may be explicitly communicated.

In a second example of the antenna port configuration message 305, the number of rows and columns of the APS (M and N) may be explicitly communicated, and the number of polarizations (P) of the antenna ports determined by UE 115-c based on M, N, and other configuration signaling. For example, UE 115-c may use M and N together with information regarding the transmission mode in which the UE 115-c is configured to operate to determine P, including whether the base station APS uses co-polarized or cross-polarized antennas.

In a third example of the antenna port configuration message 305, either the number of rows (M) or the number columns (N) of the APS may be explicitly communicated, and the number of polarizations (P) of the antenna ports as well as either N or M, respectively, determined by UE 115-c. UE 115-c may determine or derive P and either Nor M, respectively, from M or N, respectively. For example, in the case where UE 115-c is configured to support two CSI-RS resources, where CSI-RS support eight-layer (8-layer) spatial multiplexing, and M is explicitly configured to be two (2) by the antenna port configuration message 305, UE 115-c may determine that N*P is eight (8).

As further discussed both above and below, UE 115-c may determine certain CSI during communications with base station 105-b at block 325. Such CSI may include CTI, CQI, PMI, and RI associated with communication with the APS of base station 105-b. As further discussed below, and in particular with regard to FIGS. 5-7, one or more CSI reports 330 containing one or more of CTI, CQI, PMI (which may include a $1^{st}$ v-PMI, a $1^{st}$ h-PMI, and/or a $2^{nd}$ PMI), and RI may then be transmitted from UE 115-c to base station 105-b. The reported CTI may indicate to the base station 105-b which codebook in a set of codebooks should be used for a particular APS.

CSI, including PMI, discussed herein may be used to provide information to base station 105-b concerning the downlink channel conditions at the UE 115-c. Where the base station 105-b uses a 2D antenna array to perform EBF and/or FD-MIMO, PMI may correspond to a tuple of codebook indices, including a $1^{st}$ v-PMI ($i_{1V}$), a $1^{st}$ h-PMI ($i_{1H}$), and/or a $2^{nd}$ PMI ($i_2$). Each of these three codebook indices may represent values based on the RI (v) and CTI (c) as follows:

$$i_{1V}=0, 1, \ldots, N^{(v,c)}{}_{1V}-1 \tag{1}$$

$$i_{1H}=0, 1, \ldots, N^{(v,c)}{}_{1H}-1 \tag{2}$$

$$i_2=0, 1, \ldots, N_2^{(v,c)}-1 \tag{3}$$

Each code index may correspond to a precoding matrix defined in a codebook set associated with the configured APS, the reported CTI, and the reported RI. The CTI and RI may each also be communicated with a CSI report, whether the same or different CSI reports than the reported $1^{st}$ v-PMI ($i_{1V}$), $1^{st}$ h-PMI ($i_{1H}$), and/or $2^{nd}$ PMI ($i_2$). That is, for a given configured APS, a CTI, and a RI, there are three codebooks: a $1^{st}$ vertical codebook (indicated by $i_{1V}$), a $1^{st}$ horizontal codebook (indicated by $i_{1H}$), and a $2^{nd}$ codebook (indicated by $i_2$). It should be noted that a $1^{st}$ vertical codebook and a $1^{st}$ horizontal codebook may be the same for different values of CTI. In that case, CTI may be the same as the $2^{nd}$ codebook subsampling pattern.

One or more of the $1^{st}$ vertical codebook, $1^{st}$ horizontal codebook, and $2^{nd}$ codebook described above may depend on the APS or CTI. The $1^{st}$ vertical codebook may be associated with a number of rows (M) of antenna ports of the APS at base station 105-b, and the 1st horizontal codebook may be associated with a number of columns (N) of antenna port of the APS. As described above, UE 115-c may be configured with these APS parameter by the base station 105-b during antenna port configuration. The $2^{nd}$ codebook need not be dependent on the APS. At least one of the codebooks may depend on CTI, while the other two codebooks may, but need not, depend on CTI. That is, the CTI reported in the CSI may indicate a codebook to select from among at least one of the set of $1^{st}$ vertical codebooks, the set of $1^{st}$ horizontal codebooks, and the set of $2^{nd}$ codebooks.

An example of how to get a determine a particular precoding matrix from a $1^{st}$ v-PMI ($i_{1V}$), $1^{st}$ h-PMI ($i_{1H}$), and $2^{nd}$ PMI ($i_2$), for a given number of rows and columns of the APS (M and N), polarization number (P), RI (v), and CTI (c), is given by the following equation:

$$\overline{W}^{(v,c)}_{i_{1V},i_{1H},i_2} = \frac{1}{\sqrt{vMNP}}\left[\tilde{I}_P \otimes \left(\overline{X}^{(v,c)}_{V,\mu(i_{1V},i_{1H})} \otimes \overline{X}^{(v,c)}_{H,\eta(i_{1V},i_{1H})}\right)\right] \cdot \overline{Y}^{(v,c)}_{i_2} \tag{4}$$

In this equation 4, c, the CTI, may have a value c=0, 1, ..., $c_{max}$−1. $\overline{X}^{(v,c)}_{V,\mu(i_{1V},i_{1H})}$ represents the $\mu^{th}$ matrix in the v-layer $1^{st}$ vertical codebook associated with the CTI of c. $\overline{X}^{(v,c)}_{H,\eta(i_{1V},i_{1H})}$ represents the $\eta^{th}$ matrix in the v-layer $1^{st}$ horizontal codebook associated with the CTI of c. $\overline{Y}^{(v,c)}_{i_2}$ represents the $i_2^{th}$ matrix in the v-layer $2^{nd}$ codebook associated with the CTI of c.

An example of a $1^{st}$ vertical codebook follows, where the $1^{st}$ vertical codebook is associated with the number of rows of the APS (M), RI (v), and CTI (c). The codeword in the $1^{st}$ vertical codebook has the following structure:

$$\overline{X}^{(v,c)}_{V,\mu} = (\overrightarrow{u}_{o_V^{(v,c)}(\mu)} \overrightarrow{u}_{o_V^{(v,c)}(\mu)+\Delta_V^{(v,c)}} \ldots \overrightarrow{u}_{o_V^{(v,c)}(\mu)+(N_{VB}^{(v,c)}-1)\Delta_V^{(v,c)}}) \tag{5}$$

In equation 5, $\overrightarrow{u}_k = (u_{1k}\, u_{2k}\, \ldots\, u_{Mk})^T$, where $$u_{mk} = e^{j\frac{2\pi}{L_V M}mk}$$

and k=0, 1, ..., $L_V M-1$, m=1, 2, ..., M. $\mu=\mu(i_{1V}, i_{1H})$ represents the index of the codeword corresponding to ($i_{1V}$, $i_{1H}$). In an exemplary case, $\mu=\mu(i_{1V})$, that is, $\mu$ only depends on $i_{1V}$. $o_V^{(v,c)}(\mu) \in \{0, 1, \ldots, L_V M-1\}$ represents the index of the $1^{st}$ beam in the group of beams. $\Delta_V^{(v,c)}$ represents the beam stride. In an exemplary configuration, the codeword in the $1^{st}$ vertical codebook, $N_{VB}^{(v,c)} = c+1$ for c=0, 1, $L_V = 4$, $o_{V_{1V}}^{(v,c)}(\mu) = i_{1V}$, and $\Delta_V^{(v,c)} = 1$. Other configurations for the codeword in the $1^{st}$ vertical codebook may be understood to one of skill in the art.

Equation 5 above gives an example of a $1^{st}$ vertical codebook. Equation 6 that follows gives an example of a $1^{st}$ horizontal codebook, where the $1^{st}$ horizontal codebook is associated with the number of columns of the APS (N), RI (v), and CTI (c). The codeword in the $1^{st}$ vertical codebook has the following structure:

$$\overline{X}^{(v,c)}_{H,\eta} = (\overrightarrow{v}_{o_H^{(v,c)}(\eta)} \overrightarrow{v}_{o_H^{(v,c)}(\eta)+(N_{HB}^{(v,c)}-1)\Delta_H^{(v,c)}}) \tag{6}$$

In equation 6, $\overrightarrow{v}_k = (v_{1k}\, v_{2k}\, \ldots\, v_{Nk})^T$, where $$\overline{Y}^{(v,c)}_{i_2} = \begin{pmatrix} \overline{y}^{(v,c)}_{i_2 1} & & \overline{y}^{(v,c)}_{i_2 v} \\ & \cdots & \\ \phi^{(v,c)}_{i_2 1}\overline{y}^{(v,c)}_{i_2 1} & & \phi^{(v,c)}_{i_2 v}\overline{y}^{(v,c)}_{i_2 v} \end{pmatrix} \tag{7}$$

and k=0, 1, ..., $L_H N-1$, n=1, 2, ..., N. $\eta=\eta(i_{1V}, i_{1H})$ (represents the index of the codeword corresponding to ($i_{1V}$, $i_{1H}$). In an exemplary case, $\eta=\eta(i_{1H})$, that is, $\eta$ only depends on $i_{1H}$. $o_H^{(v,c)}(\eta) \in \{0, 1, \ldots, L_H N-1\}$ represents the index of the $1^{st}$ beam in the group of beams. $\Delta_H^{(v,c)}$ represents the beam stride. In an exemplary configuration, the codeword in the $1^{st}$ horizontal codebook, $N_{HB}^{(v,c)}=4$ for v=1,2; c=0,1; $N_{HB}^{(v,c)}=8$ for v=3,4; c=0,1; $L_H=8$; $o_H^{(v,c)}(\eta)=N_{HB}^{(v,c)} \cdot i_{1H} + N_{HB}^{(v,c)} \cdot i_{1V}/2$; and $\Delta_H^{(v,c)}=1$ for v=1,2; c=0, 1: $\Delta_H^{(v,c)}=8$ for v=3,4; c=0, 1. Other configurations for the codeword in the $1^{st}$ horizontal codebook may be understood to one of skill in the art.

Equation 7 that follows gives an example of a $2^{nd}$ codebook, where the $2^{nd}$ codebook is associated with the RI(v), and CTI(c). The $2^{nd}$ codebook indicates which of the beamforming directions should be selected for transmission. The codeword in the $2^{nd}$ codebook has the following structure:

$$v_{nk} = e^{j\frac{2\pi}{L_H N}nk}$$

where the number of columns in the matrix may depend on the rank, i.e. the value of RI(v). In equation 7, $\overline{Y}^{(v,c)}_{i_2}$ represents a $N_b^{(v,c)} P \times v$ matrix indicating the beam selection (and the cross-polarization co-phasing if P=2) out of the $N_b^{(v,c)} = N_{VB}^{(v,c)} N_{HB}^{(v,c)}$ beams.

$\vec{y}_{i_2r}^{(v,c)} \in \{\vec{e}_1, \vec{e}_2, \ldots, \vec{e}_{N_b}\}$, and i r=1,2, ... v, ($\vec{e}_1 \ldots \vec{e}_{N_b}) = \overline{I}_{N_b}$.

$\phi_{i_21}^{(v,c)} \in \{e^{j2\pi l/L}; l=1, 2, \ldots, L-1\}$ and r=1, 2, ..., v, representing the cross-polarization co-phasing if P=2. In an exemplary configuration for the codeword in the 2$^{nd}$ codebook, L=4 and $N_2^{(v,c)} \leq 16$. Other configurations for the codeword in the 2$^{nd}$ codebook may be understood to one of skill in the art.

Figure 4:
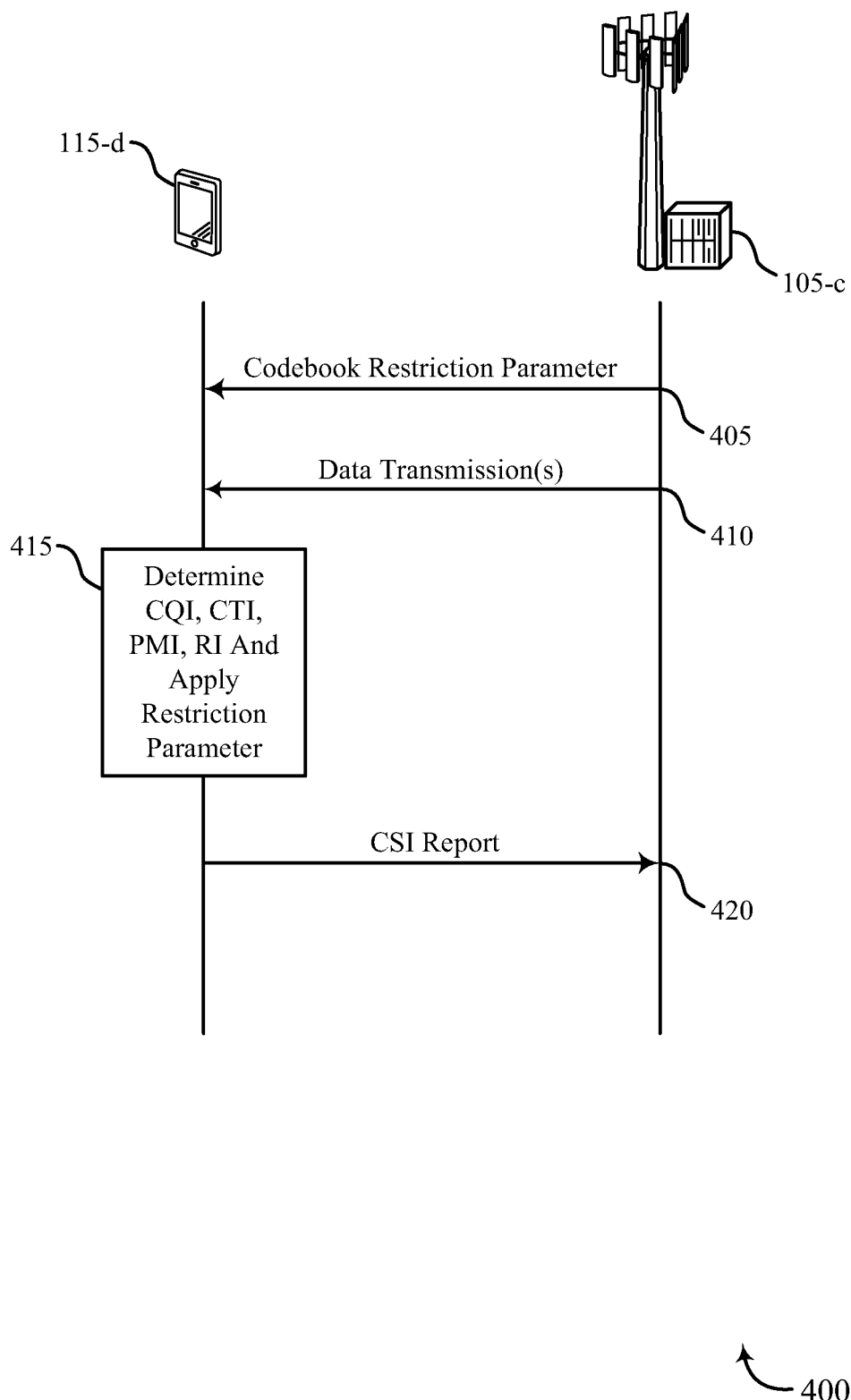
FIG. 4 illustrates an example of flow diagram for codebook subset restriction when performing CSI feedback signaling for elevation beamforming and FD-MIMO in accordance with various aspects of the present disclosure.

FIG. 4 illustrates an example of flow diagram 400 for codebook subset restriction when performing CSI feedback signaling for elevation beamforming and FD-MIMO in accordance with various aspects of the present disclosure. Flow diagram 400 may include a UE 115-d and base station 105-c, which may be examples of a UE 115 and base station 105 described with reference to FIGS. 1-3. The base station 105-c may send a codebook restriction parameter 405, either alone or as part of another message configured by higher layer signaling, for receipt by UE 115-d. With PMI including a 1$^{st}$ v-PMI, a 1$^{st}$ h-PMI, and a 2$^{nd}$ PMI, a UE may spend an increased amount of resources computing PMI as part of CSI reporting for a 2D antenna array than for a 1D antenna array. As a result, computation resources of UE 115-d may be conserved by restricting CSI reporting of PMI, RI, and CTI to be within a subset of the total number of codebooks. Such codebook subset restriction may be separately configured for a 1$^{st}$ vertical codebook, a 1$^{st}$ horizontal codebook, a 2$^{nd}$ codebook, and/or a CTI. In an example, a bitmap forms a bit sequence $a_{A-1}, \ldots, a_3, a_2, a_1, a_0$, where $a_0$, is the least significant bit (LSB) and $a_{A-1}$ is the most significant bit (MSB) in the sequence. The bit sequence has a one-to-one correspondence with the set of all valid pairs of 1$^{st}$ v-PMI and a 1$^{st}$ h-PMI ($i_{1V}$, $i_{1H}$) in all the codebook sets associated with the configured APS. In the bit sequence, a bit value of "1" indicates that PMI/RI/CTI reporting is allowed to the corresponding precoding matrix or matrices, and a bit value of "0" indicates that PMI/RI/CTI reporting is not allowed to the corresponding precoding matrix. In other examples, a "0" may indicate that reporting is allowed and a "1" may indicate that reporting is not allowed. The length of the bit sequence (A) may be determined from the following equation:

$$A = \sum_{c=1}^{c_{max}} A_c, \text{ where } A_c = \sum_{v=1}^{v_{max}} N_{1V}^{(v,c)} N_{1H}^{(v,c)} \quad (8)$$

In equation 8, $v_{max}$, represents the maximum number of layers supported by the codebook sets, and $c_{max}$ represents the total number of codebook sets associated with the configured APS. $N_{1V}^{(v,c)}$ represents the number of 1$^{st}$ vertical codebooks that may be used, and $N_{1H}^{(v,c)}$ represents the number of 1$^{st}$ horizontal codebooks that may be used.

After UE 115-d receives data transmission 410, UE 115-d may later determine CSI associated with these transmissions, which may include selecting PMI, for example as discussed above with reference to block 325 of FIG. 3. While determining CSI, including selecting PMI, UE 115-d may apply the restriction parameters as described above to restrict the number of 1$^{st}$ vertical codebooks, 1$^{st}$ horizontal codebooks, 2$^{nd}$ codebooks, and/or CTI to subsets of these codebooks and/or values of CTI that may be used when selecting PMI to include in a CSI report, including 1$^{st}$ v-PMI, 1$^{st}$ h-PMI, and/or 2$^{nd}$ PMI. UE 115-d may then send a CSI report, including CSI consistent with selections for PMI consistent with the restricted subset of codebooks.

An example of a codebook subset restriction follows. In this example, bit $a_{g_1(c)+f_1(v-1,c)+N_{1H}^{(v,c)} \cdot i_{1V}+i_{1H}}$ is associated with $$\vec{W}_{i_{1V},i_{1H},i_2} i_2 = 0, 1, \ldots, N_2^{(v,c)} - 1 \quad (9)$$

where:

$$f_1(r, c) = \begin{cases} 0, & r = 0 \\ \sum_{v=1}^{r} N_{1V}^{(v,c)} N_{1H}^{(v,c)}, & r = 1, 2, \ldots, v_{max} - 1 \end{cases} \quad (10)$$

$$g_1(s) = \begin{cases} 0, & s = 0 \\ \sum_{c=0}^{s-1} A_C, & s = 1, 2, \ldots, c_{max} - 1 \end{cases} \quad (11)$$

These formulations for codebook subset restriction may be used to determine whether to report indices such that if bit $a_{g_1(c)+f_1(v-1,c)+N_{1H}^{(v,c)} \cdot i_{1V}+i_{1H}} = 1$, then the CSI will be reported as a CSI report 420, but if $a_{g_1(c)+f_1(v-1,c)+N_{1H}^{(v,c)} \cdot i_{1V}+i_{1H}} = 0$, the CSI will not be reported as a CSI report 420.

Different CSI reports may be sent by UE 115 to a base station at different times. In some examples CSI reports may be sent aperiodically using PUSCH. PUSCH may not impose size limitations on the CSI reports to be sent, such that CSI may be fed back from UE 115 to base station 105 in a greater number of bits than when using PUCCH, where the payload size of a CSI report may be more limited.

In a first example, UE 115 reports RI, wideband CTI, wideband 1$^{st}$ v-PMI, wideband 1$^{st}$ h-PMI, wideband or subband 2$^{nd}$ PMI, and wideband or subband CQI may be reported by UE 115. The use of subband reporting may result in different values being for reported for different subbands.

In a second example, the 2$^{nd}$ codebook depends on the value of CTI, but the 1$^{st}$ horizontal codebook and the 1$^{st}$ vertical codebook are each independent of the value of CTI (a common codebook is used for different values of CTI). In this second example, CTI may be reported differently for different subbands. In such case, RI, wideband 1$^{st}$ v-PMI, wideband 1$^{st}$ h-PMI, wideband or subband CTI, wideband or subband 2$^{nd}$ PMI, and wideband or subband CQI may be reported by UE 115. Subband-specific reporting may occur, for example, because different subbands report different values of CTI.

In a third example, like the second example, the 1$^{st}$ horizontal codebook and the 1$^{st}$ vertical codebook are each independent of the value of CTI, but the 2$^{nd}$ codebook depends on the value of CTI. In this third example, wideband CTI or subband CTI may be reported depending on the value of RI. For example, if RI is "1", then wideband CTI may be reported by UE 115, and if RI is greater than "1", then subband CTI may be reported by UE 115.

In addition to or instead of using a PUSCH to aperiodically transmit CSI, a UE 115 may be semi-statically configured by higher layers to periodically feed back different CSI, including CQI, PMI, PTI, and/or RI on the PUCCH according to one or more of a variety of CSI reporting modes. In an example, UE 115 is configured to periodically feedback CSI using a PUCCH, and CTI is not reported by UE 115 as part of the CSI. UE 115 may determine CQI, PMI, and/or RI by assuming a CTI which may be configured by higher layer signaling or be a predefined CTI.

In some examples, UE 115 may be configured with PMI/RI reporting, and UE 115 may support different periodic CSI reporting modes that are configured at the UE 115 by the base station 105 via higher layer signaling. When using PUCCH, the payload size available for CSI reporting may be limited, and CSI may be reported for EBF and FD-MIMO in more than one CSI report type that may be sent at different times, with certain portions of CSI sent in some CSI report types, and other certain portions of CSI sent in other CSI report types. Table 1 illustrates eight CSI report types that may be sent from UE 115 to base station 105 at different times according to an example. Such CSI report types may be fed back with distinct periods and offsets. Each of the CSI report types in Table 1 may be assigned to a priority group. Priority group 1 (with the highest priority) may include CSI report types 1 and 4 (generally related to RI). Priority group 2 (with the second highest priority) may include CSI report types 2 and 7 (generally related to $1^{st}$ v-PMI and/or $1^{st}$ h-PMI). Priority group 3 (with the third highest priority) may include CSI report types 3, 5, and 6 (generally related to wideband CQI). And priority group 4 (with the lowest priority) may include CSI report type 8 (generally related to subband CQI).

TABLE 1

| CSI Report Type No. | Contents of CSI |
|---|---|
| 1 | RI and wideband $1^{st}$ v-PMI feedback (up to 5 bits) |
| 2 | wideband $1^{st}$ h-PMI feedback |
| 3 | wideband CQI and $2^{nd}$ PMI feedback |
| 4 | RI and PTI feedback |
| 5 | wideband CQI, $1^{st}$ v-PMI, and $2^{nd}$ PMI feedback |
| 6 | wideband CQI, $1^{st}$ h-PMI, and $2^{nd}$ PMI feedback |
| 7 | $1^{st}$ v-PMI and $1^{st}$ h-PMI feedback (up to 5 bits) |
| 8 | subband CQI and $2^{nd}$ PMI feedback |

Figure 5:
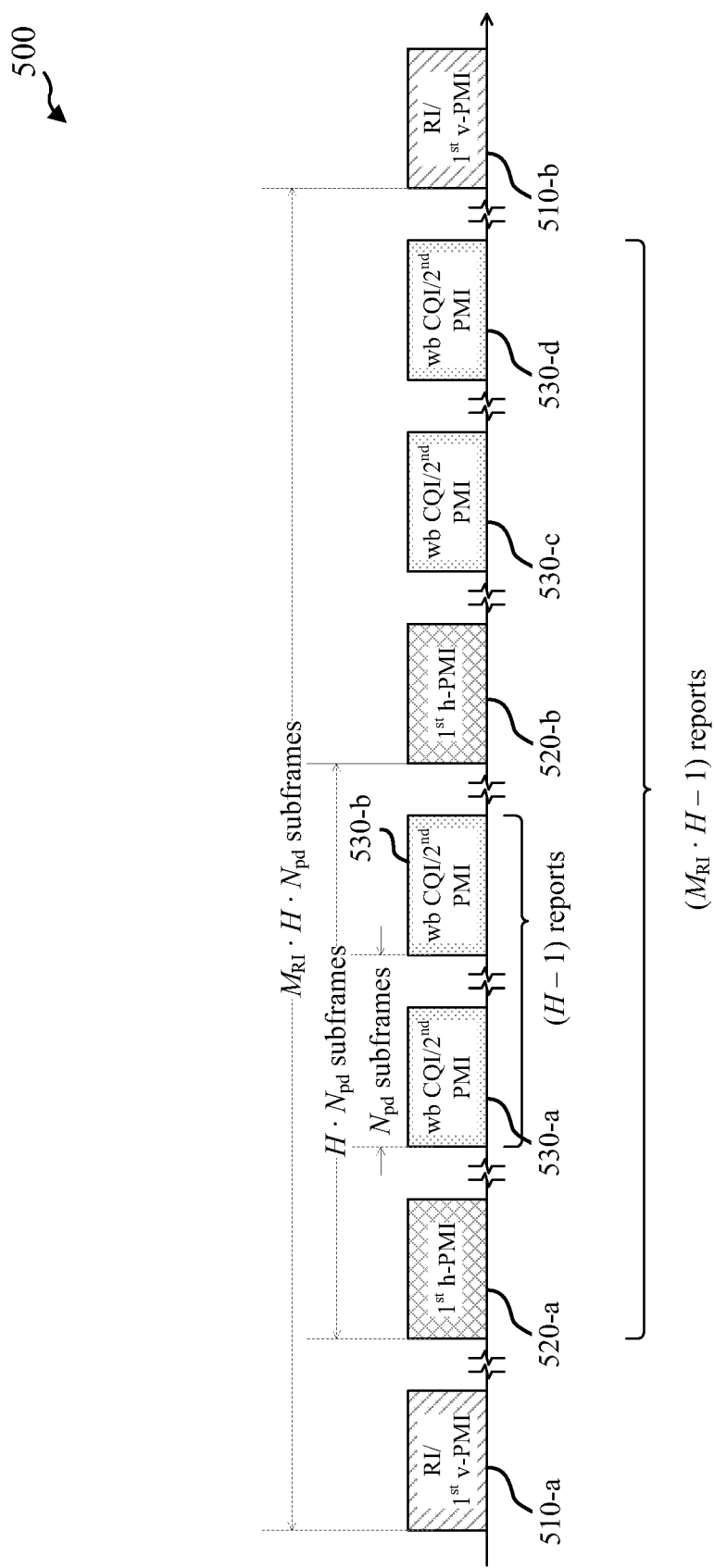
FIG. 5 illustrates an example of a signal flow for CSI feedback signaling for elevation beamforming and FD-MIMO in accordance with various aspects of the present disclosure.

FIG. 5 illustrates an example of a signal flow 500 for CSI feedback signaling for elevation beamforming and FD-MIMO in accordance with various aspects of the present disclosure. Signal flow 500 may represent a first CSI reporting mode, and may include transmissions from a UE 115 to a base station 105. UE 115 to a base station 105 may be examples of a UE 115 and base station 105 described with reference to FIGS. 1-4. CSI reporting according to this mode may use different types of CSI reports.

A first CSI report type 510 may report a RI and $1^{st}$ v-PMI with a periodicity in subframes defined by $M_{R1} \cdot H \cdot N_{pd}$ subframes. First CSI report type 510 may have a relative offset defined by the sum of $N_{OFFSET,RI}$ and $N_{OFFSET,CQI}$. A second CSI report type 520 may report a $1^{st}$ h-PMI with a periodicity in subframes defined by $H \cdot N_{pd}$ subframes. Second CSI report type 520 may have a relative offset defined by $N_{OFFSET,CQI}$. A third CSI report type 530 may report a wideband CQI and $2^{nd}$ PMI with a periodicity in subframes defined by $N_{pd}$ subframes. Third CSI report type 530 may have a relative offset defined by $N_{OFFSET,CQI}$. Each of $M_{RI}$, H, $N_{pd}$, $N_{OFFSET,RI}$, and $N_{OFFSET,CQI}$ may be configured by higher layer signaling from base station 105.

As illustrated in FIG. 5, each of the first CSI report type 510, the second CSI report type 520, and the third CSI report type 530 may be sent at different times according to their respective periodicities, with first CSI report type 510 taking priority over second CSI report type 520 when their timing conflicts, and second CSI report type 520 taking priority over third CSI report type 530 when their timing conflicts. In the particular example illustrated as signal flow 500, first CSI report type 510-a is followed by signal flow 500, which is followed by first CSI report type 510-a, which is followed by second CSI report type 520-a, which is followed by third CSI report type 530-a, which is followed by H-1 of third CSI report type 530, ending with third CSI report type 530-b, which is followed by second CSI report type 520-b, and so on until the next instance of the first CSI report type 510-b. Thus, CSI is reported using three different CSI reports to support EBF and FD-MIMO.

FIGS. 6A and 6B illustrate examples of signal flows 600 and 601 for CSI feedback signaling for elevation beamforming and FD-MIMO in accordance with various aspects of the present disclosure. Signal flows 600 and 601 may represent a second CSI reporting mode, and may include transmissions from a UE 115 to a base station 105. UE 115 to a base station 105 may be examples of a UE 115 and base station 105 described with reference to FIGS. 1-5. CSI reporting according to this mode may use different types of CSI reports, and include reporting of PTI. Signal flow 600 illustrates the case where PTI is reported with a first value "0", and signal flow 601 illustrates the case where PTI is reported with a first value "0". Signal flow 600 may be suitable to a situation where UE 115 has a large azimuth angular spread, and thus the $1^{st}$ h-PMI may be reported more frequently than $1^{st}$ v-PMI. Signal flow 601 may be suitable to a situation where UE 115 has a large elevation angular spread, and thus the $1^{st}$ v-PMI may be reported more frequently than $1^{st}$ h-PMI.

Referring to FIG. 6A, a first CSI report type 610 may report a RI and PTI (here PTI=0) with a periodicity in subframes defined by $M_{RI} \cdot H \cdot N_{pd}$ subframes. First CSI report type 610 may have a relative offset defined by the sum of $N_{OFFSET,RI}$ and $N_{OFFSET,CQI}$. A second CSI report type 620 may report a $1^{st}$ v-PMI with a periodicity in subframes defined by $H \cdot N_{pd}$ subframes. Second CSI report type 620 may have a relative offset defined by $N_{OFFSET,CQI}$. A third CSI report type 630 may report a $1^{st}$ h-PMI, wideband CQI, and $2^{nd}$ PMI with a periodicity in subframes defined by $N_{pd}$ subframes. Third CSI report type 630 may have a relative offset defined by $N_{OFFSET,CQI}$.

Referring to FIG. 6B, a first CSI report type 610 may report a RI and PTI (here PTI=1) with a periodicity in subframes defined by $M_{RI} \cdot H \cdot N_{pd}$ subframes. A fourth CSI report type 640 may report a $1^{st}$ h-PMI with a periodicity in subframes defined by $H \cdot N_{pd}$ subframes. Fourth CSI report type 640 may have a relative offset defined by $N_{OFFSET,CQI}$. A fifth CSI report type 650 may report a $1^{st}$ v-PMI, wideband CQI, and $2^{nd}$ PMI with a periodicity in subframes defined by $N_{pd}$ subframes. Fifth CSI report type 650 may have a relative offset defined by $N_{OFFSET,CQI}$.

As illustrated in FIGS. 6A and 6B, each of the first CSI report type 610, the second CSI report type 620, the third CSI report type 630, the fourth CSI report type 640, and the fifth CSI report type 650 may be sent at different times according to their respective periodicities, with those report types having a shorter periodicity taking priority over those CSI report types with a longer periodicity when the timing of the CSI reports conflicts.

FIGS. 7A and 7B illustrate examples of signal flows 700 and 701 for CSI feedback signaling for elevation beamforming and FD-MIMO in accordance with various aspects of the present disclosure. Signal flows 700 and 701 may represent a third CSI reporting mode, and may include transmissions from a UE 115 to a base station 105. UE 115 to a base station 105 may be examples of a UE 115 and base station 105 described with reference to FIGS. 1-6. CSI reporting according to this mode may use different types of CSI reports, and include reporting of PTI. Signal flow 700 illustrates the case where PTI is reported with a first value "0", and signal flow 701 illustrates the case where PTI is reported with a first value "0". Signal flow 700 may be suitable to a situation where UE 115 may report a wideband CQI. Signal flow 701 may be suitable to a situation where UE 115 may report a wideband CQI followed by a number of reports of subband CQI, for example where a channel exhibits increased frequency selectivity.

Referring to FIG. 7A, a first CSI report type 710 may report a RI and PTI (here PTI=0) with a periodicity in subframes defined by $M_{RI} \cdot H \cdot N_{pd}$ subframes. First CSI report type 710 may have a relative offset defined by the sum of $N_{OFFSET,RI}$ and $N_{OFFSET,CQI}$. A second CSI report type 720 may report a $1^{st}$ v-PMI and $1^{st}$ h-PMI with a periodicity in subframes defined by $H \cdot N_{pd}$ subframes. Second CSI report type 720 may have a relative offset defined by $N_{OFFSET,CQI}$. A third CSI report type 730 may report a wideband CQI and $2^{nd}$ PMI with a periodicity in subframes defined by $N_{pd}$ subframes. Third CSI report type 730 may have a relative offset defined by $N_{OFFSET,CQI}$.

Referring to FIG. 7B, the first CSI report type 710 may report a RI and PTI (here PTI=1) with a periodicity in subframes defined by $M_{RI} \cdot H \cdot N_{pd}$ subframes. The third CSI report type 730 may report a wideband CQI and $2^{nd}$ PMI with a periodicity in subframes defined by $H \cdot N_{pd}$ subframes. A fourth CSI report type 740 may then report a subband CQI and $2^{nd}$ PMI with a periodicity in subframes defined by $N_{pd}$ subframes. Fourth CSI report type 740 may have a relative offset defined by $N_{OFFSET,CQI}$.

As illustrated in FIGS. 7A and 7B, each of the first CSI report type 710, the second CSI report type 720, the third CSI report type 730, and the fourth CSI report type 740 may be sent at different times according to their respective periodicities, with those report types having a shorter periodicity taking priority over those CSI report types with a longer periodicity when the timing of the CSI reports conflicts.

Figure 8:
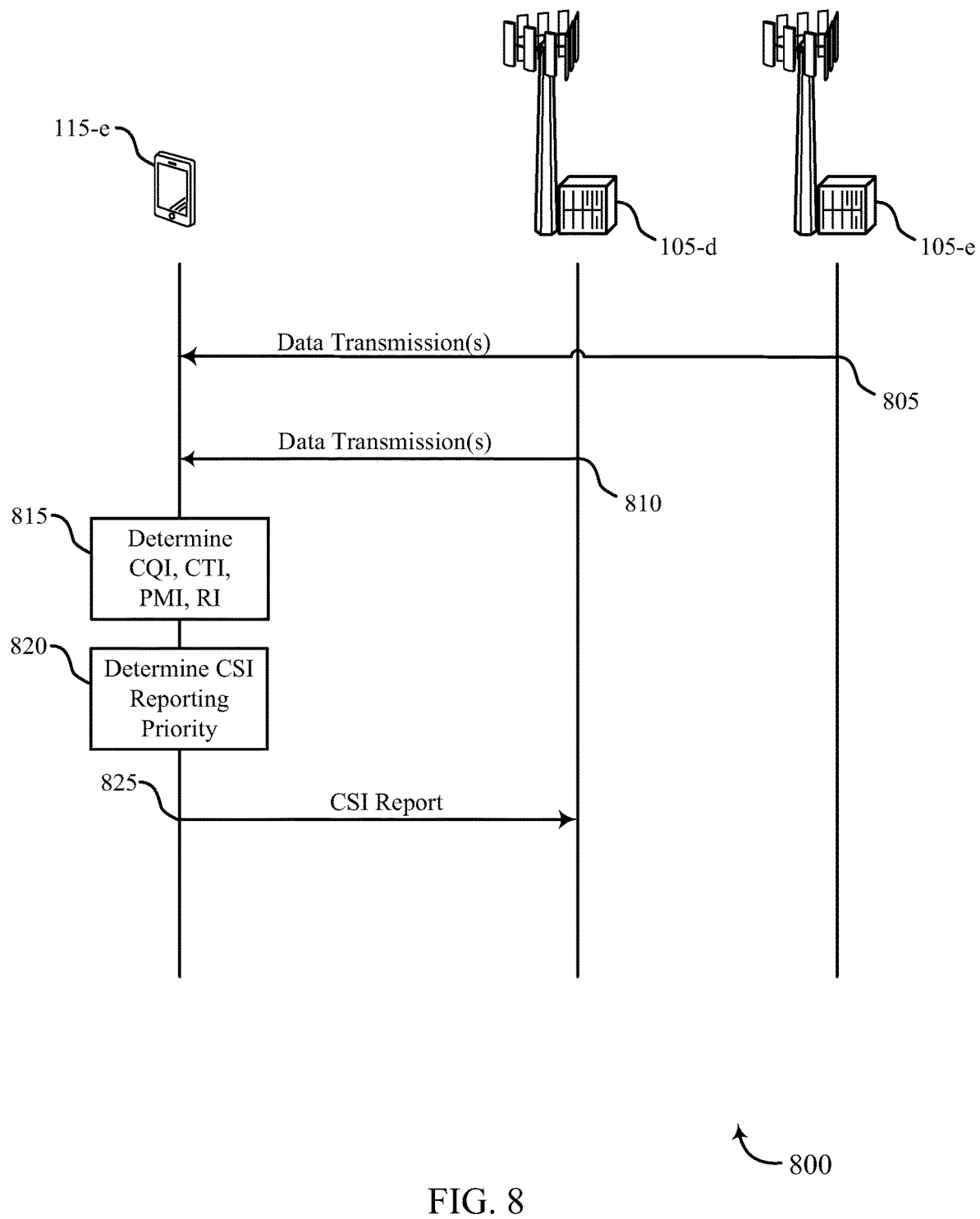
FIG. 8 illustrates an example of antenna port configuration flow diagram for CSI feedback signaling for elevation beamforming and FD-MIMO in accordance with various aspects of the present disclosure.

FIG. 8 illustrates an example of antenna port configuration flow diagram 800 for CSI feedback signaling for elevation beamforming and FD-MIMO in accordance with various aspects of the present disclosure. Flow diagram 800 may include a UE 115-e, base station 105-d, and base station 105-e, which may be examples of a UE 115 and base station 105 described with reference to FIGS. 1-7. Base station 105-d may send data transmissions 805 to UE 115-e and base station 105-e may send data transmissions 810 to UE 115-e. UE 115-e may then determine CSI, including CQI, CTI, PMI, and RI, related to the data transmissions 805 and 810 from base stations 105-d and 105-e at block 815. However, where CSI report collisions occur, at block 820, UE 115-e determines priority for CSI reporting to base station 105-d or base station 105-e. Where such a collision is for a CSI report type in different priority groups (as discussed above with respect to Table 1), i.e. an inter-group collision, the CSI report with the lower priority is dropped in favor of transmitting the CSI report having the higher priority as CSI report 825. Where such a collision is for a CSI report type in the same priority group (as discussed above with respect to Table 1), i.e. an intra-group collision, UE 115-e determines the CSI report to send based on an evaluation of one or more of the serving cell index, CSI process index and/or subframe set index.

In other examples in accordance with various aspects of the present disclosure, the UE 115 may identify, at a user equipment (UE), a codebook type indicator (CTI) that indicates a codebook among a set of codebooks, such that the codebook may be associated with a two-dimensional antenna port structure of a base station.

In other examples in accordance with various aspects of the present disclosure, the UE 115 may select a precoding matrix indicator (PMI) based on the CTI.

In other examples in accordance with various aspects of the present disclosure, the UE 115 may transmit, from the UE to the base station, a channel state information (CSI) report including the PMI. In some examples the CSI report further includes the CTI. In some examples selecting the PMI based at least in part on the CTI comprises: selecting a first vertical PMI associated with a first vertical codebook.

In other examples in accordance with various aspects of the present disclosure, the UE 115 may select a first horizontal PMI associated with a first horizontal codebook.

In other examples in accordance with various aspects of the present disclosure, the UE 115 may select a second PMI associated with a second codebook.

In other examples in accordance with various aspects of the present disclosure, the UE 115 may one or more of selecting the first vertical PMI, selecting the first horizontal PMI, or selecting the second PMI is based at least in part on the CTI. In some examples the codebook includes a first vertical codebook associated with a number of rows of the two-dimensional antenna port structure. In some examples a first horizontal codebook associated with a number of columns of the two-dimensional antenna port structure. In some examples the codebook further includes a second codebook associated with a number of polarizations of the two-dimensional antenna port structure.

In other examples in accordance with various aspects of the present disclosure, the UE 115 may restrict a size of one or more of the first vertical codebook or the first horizontal codebook.

In other examples in accordance with various aspects of the present disclosure, the UE 115 may receive, at the UE, a bitmap parameter associated with a restricted codebook size to be applied to the one or more of the first vertical codebook or the first horizontal codebook when restricting the size.

In other examples in accordance with various aspects of the present disclosure, the UE 115 may select the PMI may be further based on a rank indicator (RI).

In other examples in accordance with various aspects of the present disclosure, the UE 115 may aperiodically transmit a set of CSI reports using a physical uplink shared channel (PUSCH). In some examples aperiodically transmitting the plurality of CSI reports using the physical uplink shared channel (PUSCH) includes aperiodically transmitting the CTI, a rank indicator (RI), a first vertical PMI, and a first horizontal PMI.

In other examples in accordance with various aspects of the present disclosure, the UE 115 may periodically transmit a set of CSI reports using a physical uplink control channel (PUCCH). In some examples periodically transmitting the plurality of CSI reports using the PUCCH includes transmitting a first CSI report encoding a rank indicator (RI) and a first vertical PMI.

In other examples in accordance with various aspects of the present disclosure, the UE 115 may transmit a second CSI report encoding a first horizontal PMI.

In other examples in accordance with various aspects of the present disclosure, the UE 115 may transmit a third CSI report encoding a wideband channel quality indicator (CQI) and a second PMI. In some examples periodically transmitting the plurality of CSI reports using the PUCCH includes transmitting a first CSI report encoding a rank indicator (RI) and a precoding type indicator (PTI).

In other examples in accordance with various aspects of the present disclosure, the UE 115 may transmit a second CSI report encoding one of a first vertical PMI or a first horizontal PMI with a second periodicity based on the PTI.

In other examples in accordance with various aspects of the present disclosure, the UE 115 may transmit a third CSI report encoding a wideband channel quality indicator (CQI), a second PMI, and one of the first horizontal PMI or the first vertical PMI based on the PTI. In some examples periodically transmitting the plurality of CSI reports using the PUCCH includes transmitting a first CSI report encoding a rank indicator (RI) and a precoding type indicator (PTI).

In other examples in accordance with various aspects of the present disclosure, the UE 115 may transmit a wideband channel quality indicator (CQI).

In other examples in accordance with various aspects of the present disclosure, the UE 115 may transmit a third CSI report encoding, based on the PTI, one of a subband CQI or a combined first horizontal PMI and first vertical PMI.

Figure 9:
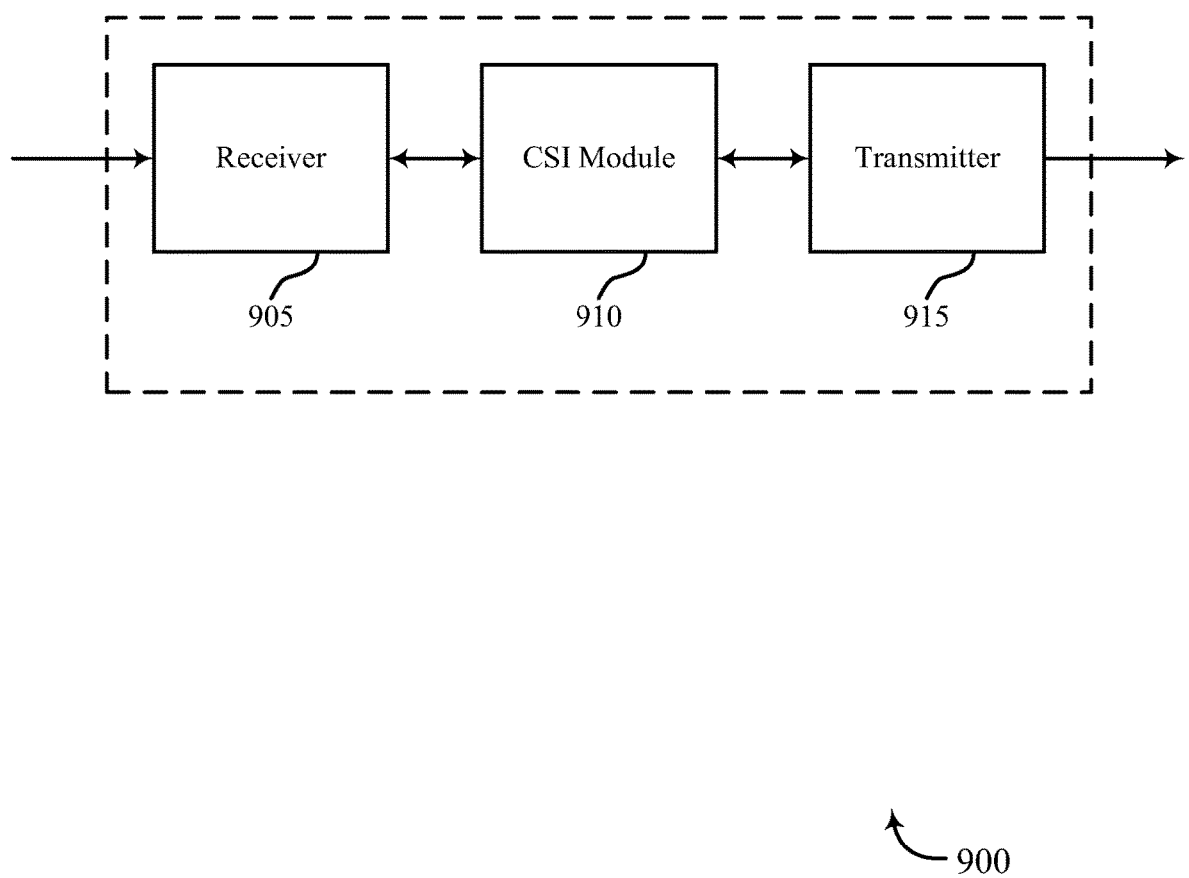
FIGS. 9-11 show block diagrams of a wireless device that supports CSI feedback signaling for elevation beamforming and FD-MIMO in accordance with various aspects of the present disclosure.

FIG. 9 shows a block diagram of a wireless device 900 configured for CSI feedback signaling for elevation beamforming and FD-MIMO in accordance with various aspects of the present disclosure. Wireless device 900 may be an example of aspects of a UE 115 described with reference to FIGS. 1-8. Wireless device 900 may include a receiver 905, a CSI module 910, or a transmitter 915. Wireless device 900 may also include a processor. Each of these components may be in communication with each other.

The receiver 905 may receive information such as packets, user data, or control information associated with various information channels (e.g., control channels, data channels, and information related to CSI feedback signaling for elevation beamforming and FD-MIMO, etc.). Information may be passed on to the CSI module 910, and to other components of wireless device 900.

The CSI module 910 may identify, at a user equipment (UE), a codebook type indicator (CTI) that indicates a codebook among a set of codebooks, wherein the codebook is associated with a two-dimensional antenna port structure of a base station, select a precoding matrix indicator (PMI) based at least in part on the CTI, and transmit, from the UE to the base station, a channel state information (CSI) report including the PMI.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas.

Figure 10:
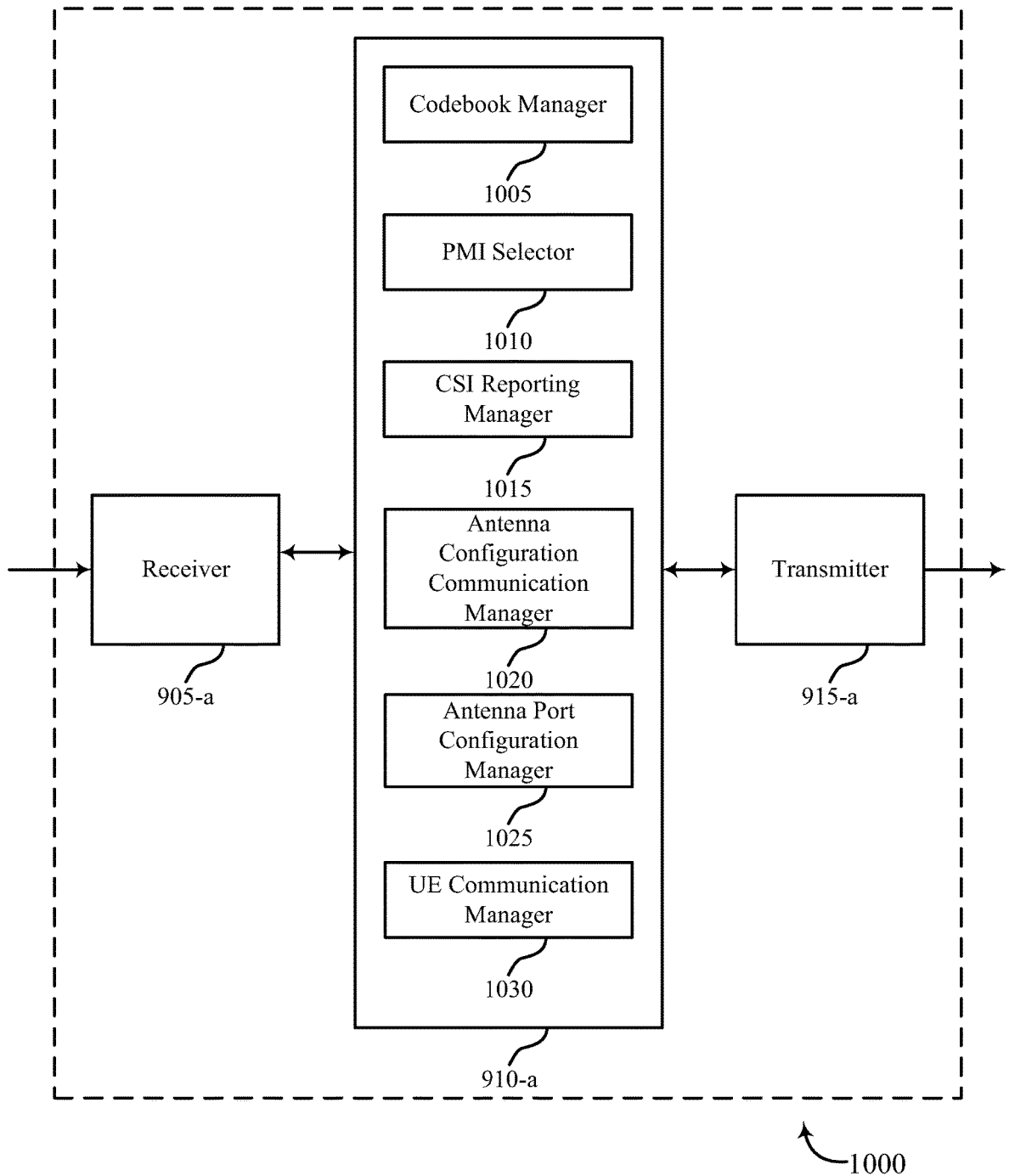

FIG. 10 shows a block diagram of a wireless device 1000 for CSI feedback signaling for elevation beamforming and FD-MIMO in accordance with various aspects of the present disclosure. Wireless device 1000 may be an example of aspects of a wireless device 900 or a UE 115 described with reference to FIGS. 1-9. Wireless device 1000 may include a receiver 905-a, a CSI module 910-a, or a transmitter 915-a. Wireless device 1000 may also include a processor. Each of these components may be in communication with each other. The CSI module 910-a may also include a codebook manager 1005, a PMI selector 1010, and a CSI reporting manager 1015.

The receiver 905-a may receive information which may be passed on to CSI module 910-a, and to other components of wireless device 1000. The CSI module 910-a may perform the operations described with reference to FIG. 9. The transmitter 915-a may transmit signals received from other components of wireless device 1000.

The codebook manager 1005 may identify, at a user equipment (UE), a codebook type indicator (CTI) that indicates a codebook among a set of codebooks, wherein the codebook is associated with a two-dimensional antenna port structure of a base station as described with reference to FIGS. 1-8. In some examples, the codebook includes a first vertical codebook associated with a number of rows of the two-dimensional antenna port structure. In some examples, a first horizontal codebook associated with a number of columns of the two-dimensional antenna port structure. In some examples, the codebook further includes a second codebook associated with a number of polarizations of the two-dimensional antenna port structure. The codebook manager 1005 may also restrict a size of one or more of the first vertical codebook or the first horizontal codebook. The codebook manager 1005 may also receive, at the UE, a bitmap parameter associated with a restricted codebook size to be applied to the one or more of the first vertical codebook or the first horizontal codebook when restricting the size.

The PMI selector 1010 may select a precoding matrix indicator (PMI) based at least in part on the CTI as described with reference to FIGS. 1-8. In some examples, selecting the PMI based at least in part on the CTI comprises selecting a first vertical PMI associated with a first vertical codebook. The PMI selector 1010 may also select a first horizontal PMI associated with a first horizontal codebook. The PMI selector 1010 may also select a second PMI associated with a second codebook. The PMI selector 1010 may also one or more of selecting the first vertical PMI, selecting the first horizontal PMI, or selecting the second PMI is based at least in part on the CTI. The PMI selector 1010 may also select the PMI is further based at least in part on a rank indicator (RI).

The CSI reporting manager 1015 may transmit, from the UE to the base station, a channel state information (CSI) report including the PMI as described with reference to FIGS. 1-8. In some examples, the CSI report further includes the CTI.

The antenna configuration communication manager 1020 may receive, at a UE, a first antenna port configuration parameter associated with an antenna port structure of a base station as described with reference to FIGS. 1-8. The antenna configuration communication manager 1020 may also receive, at the UE, a third antenna port configuration parameter associated with the antenna port structure, wherein determining the second antenna port configuration parameter is further based at least in part on the third antenna port configuration parameter. The antenna configuration communication manager 1020 may also the first antenna port configuration parameter includes a number of rows of the antenna port structure. In some examples, the third antenna port configuration parameter includes a number of columns of the antenna port structure. The antenna configuration communication manager 1020 may also the first antenna port configuration parameter is one of a number of rows of the antenna port structure or a number of columns of the antenna port structure. In some examples, the antenna port structure comprises a cross-polarized two-dimensional antenna port structure.

The antenna port configuration manager 1025 may determine, based at least in part on the first antenna port configuration parameter, a second antenna port configuration parameter associated with the antenna port structure as described with reference to FIGS. 1-8. In some examples, the second antenna port configuration parameter includes a number of polarizations of the antenna port structure. In some examples, the second antenna port configuration parameter includes a polarization arrangement of the antenna port structure. The antenna port configuration manager 1025 may also determine the second antenna port configuration parameter is based at least in part on the first antenna port configuration parameter and a third antenna port configuration parameter of the antenna port structure.

The UE communication manager 1030 may transmit or receiving data at the UE based at least in part on the first antenna port configuration parameter and the second antenna port configuration parameter as described with reference to FIGS. 1-8. The UE communication manager 1030 may also transmit or receiving the data is further based at least in part on the third antenna port configuration parameter.

Figure 11:
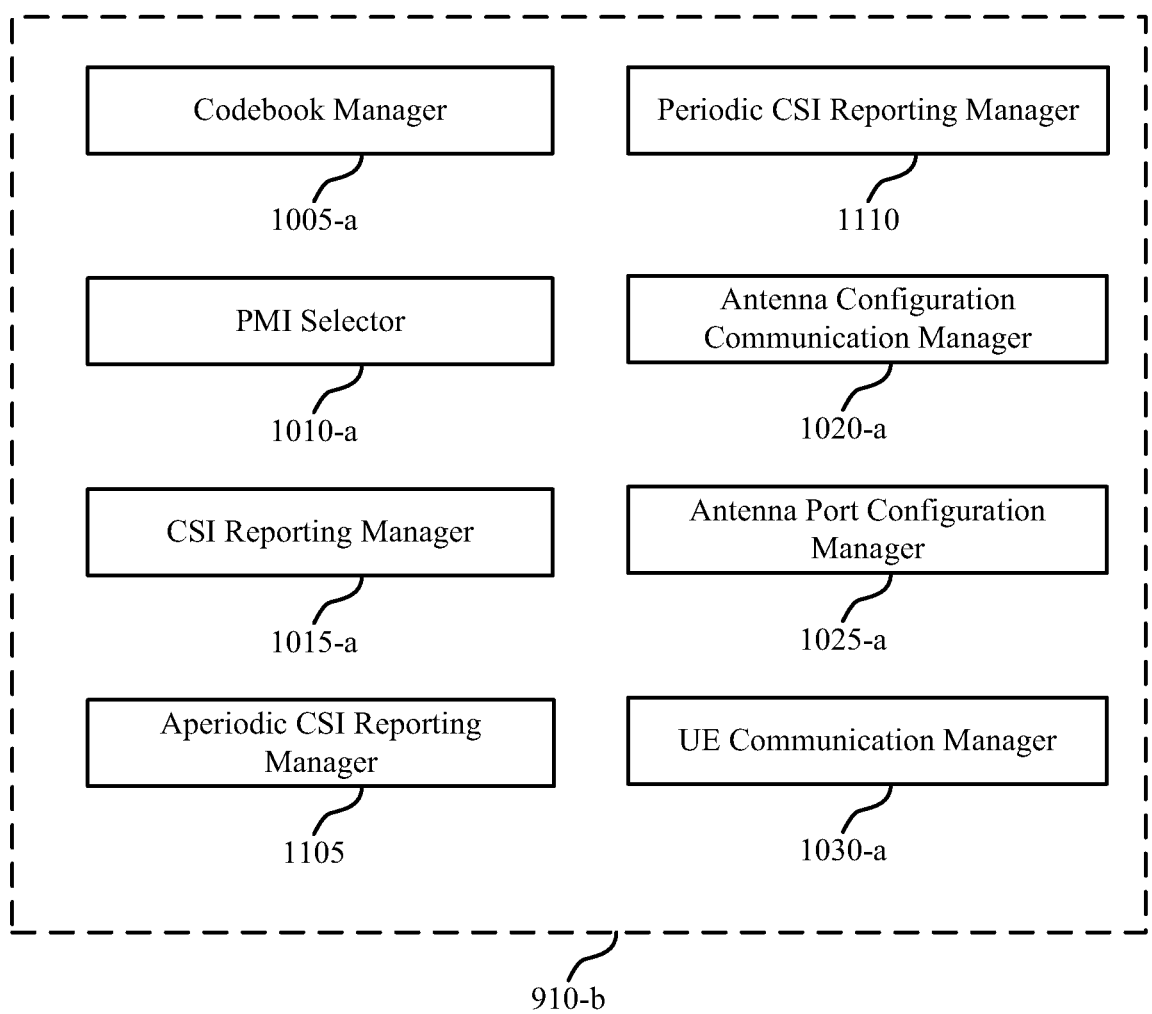

FIG. 11 shows a block diagram 1100 of a CSI module 910-*b* which may be a component of a wireless device 900 or a wireless device 1000 for CSI feedback signaling for elevation beamforming and FD-MIMO in accordance with various aspects of the present disclosure. The CSI module 910-*b* may be an example of aspects of a CSI module 910 described with reference to FIGS. 9-10. The CSI module 910-*b* may include a codebook manager 1005-*a*, a PMI selector 1010-*a*, a CSI reporting manager 1015-*a*, an antenna configuration communication manager 1020-*a*, an antenna port configuration manager 1025-*a*, and a UE communication manager 1030-*a*. Each of these modules may perform the functions described with reference to FIG. 10. Each of these modules may perform the functions described with reference to FIG. 10. The CSI module 910-*b* may also include an aperiodic CSI reporting manager 1105, and a periodic CSI reporting manager 1110.

The aperiodic CSI reporting manager 1105 may aperiodically transmit a plurality of CSI reports using a physical uplink shared channel (PUSCH) as described with reference to FIGS. 1-8. In some examples, aperiodically transmitting the plurality of CSI reports using the PUSCH includes aperiodically transmitting the CTI, a rank indicator (RI), a first vertical PMI, and a first horizontal PMI.

The periodic CSI reporting manager 1110 may periodically transmit a plurality of CSI reports using a physical uplink control channel (PUCCH) as described with reference to FIGS. 1-8. In some examples, periodically transmitting the plurality of CSI reports using the PUCCH includes transmitting a first CSI report encoding a rank indicator (RI) and a first vertical PMI. The periodic CSI reporting manager 1110 may also transmit a second CSI report encoding a first horizontal PMI. The periodic CSI reporting manager 1110 may also transmit a third CSI report encoding a wideband channel quality indicator (CQI) and a second PMI. In some examples, periodically transmitting the plurality of CSI reports using the PUCCH includes transmitting a first CSI report encoding a rank indicator (RI) and a precoding type indicator (PTI). The periodic CSI reporting manager 1110 may also transmit a second CSI report encoding one of a first vertical PMI or a first horizontal PMI with a second periodicity based at least in part on the PTI. The periodic CSI reporting manager 1110 may also transmit a third CSI report encoding a wideband channel quality indicator (CQI), a second PMI, and one of the first horizontal PMI or the first vertical PMI based at least in part on the PTI. In some examples, periodically transmitting the plurality of CSI reports using the PUCCH includes transmitting a first CSI report encoding a rank indicator (RI) and a precoding type indicator (PTI). The periodic CSI reporting manager 1110 may also transmit a wideband channel quality indicator (CQI). The periodic CSI reporting manager 1110 may also transmit a third CSI report encoding, based at least in part on the PTI, one of a subband CQI or a combined first horizontal PMI and first vertical PMI.

Figure 12:
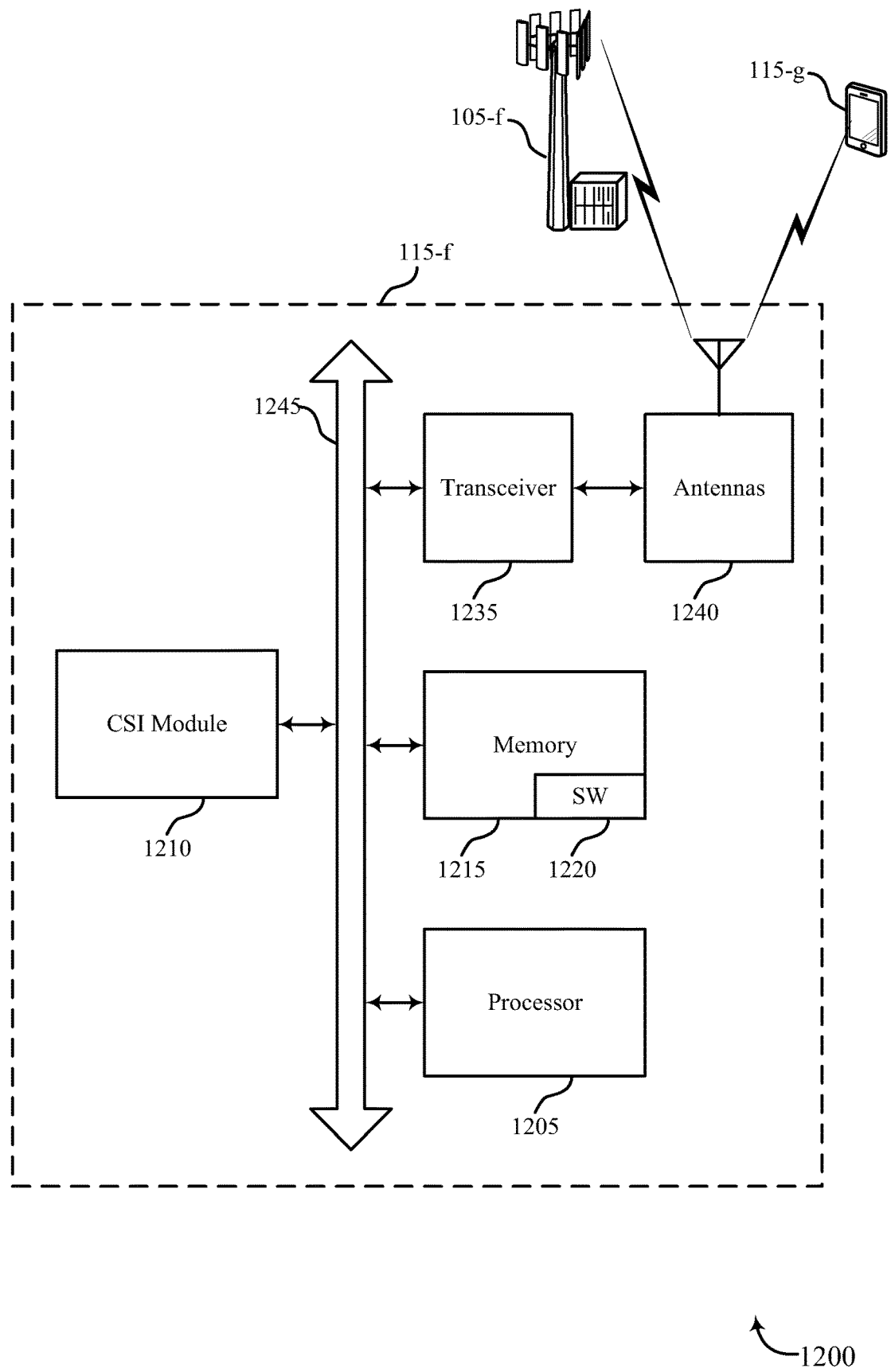
FIG. 12 illustrates a block diagram of a system including a user equipment (UE) that supports CSI feedback signaling for elevation beamforming and FD-MIMO in accordance with various aspects of the present disclosure.

FIG. 12 shows a diagram of a system 1200 including a UE 115 configured for CSI feedback signaling for elevation beamforming and FD-MIMO in accordance with various aspects of the present disclosure. System 1200 may include UE 115-XXX, which may be an example of a wireless device 900, a wireless device 1000, or a UE 115 described with reference to FIGS. 1, 2 and 9-11. UE 115-*f* may include a CSI module 1210, which may be an example of a CSI module 910 described with reference to FIGS. 9-11. UE 115-*f* may also include components for bi-directional voice and data communications including components for transmitting communications and components for receiving communications. For example, UE 115-*f* may communicate bi-directionally with base station 105-*f* and/or UE 115-*g*.

UE 115-*f* may also include a processor 1205, and memory 1215 (including software (SW)) 1220, a transceiver 1235, and one or more antenna(s) 1240, each of which may communicate, directly or indirectly, with one another (e.g., via buses 1245). The transceiver 1235 may communicate bi-directionally, via the antenna(s) 1240 or wired or wireless links, with one or more networks, as described above. For example, the transceiver 1235 may communicate bi-directionally with a base station 105 or another UE 115. The transceiver 1235 may include a modem to modulate the packets and provide the modulated packets to the antenna(s) 1240 for transmission, and to demodulate packets received from the antenna(s) 1240. While UE 115-*f* may include a single antenna 1240, UE 115-*f* may also have multiple antennas 1240 capable of concurrently transmitting or receiving multiple wireless transmissions.

The memory 1215 may include random access memory (RAM) and read only memory (ROM). The memory 1215 may store computer-readable, computer-executable software/firmware code 1220 including instructions that, when executed, cause the processor 1205 to perform various functions described herein (e.g., CSI feedback signaling for elevation beamforming and FD-MIMO, etc.). Alternatively, the software/firmware code 1220 may not be directly executable by the processor 1205 but cause a computer (e.g., when compiled and executed) to perform functions described herein. The processor 1205 may include an intelligent hardware device, (e.g., a central processing unit (CPU), a microcontroller, an application specific integrated circuit (ASIC), etc.)

The components of wireless device 900, wireless device 1000, CSI module 910, and CSI module 1210 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 13:
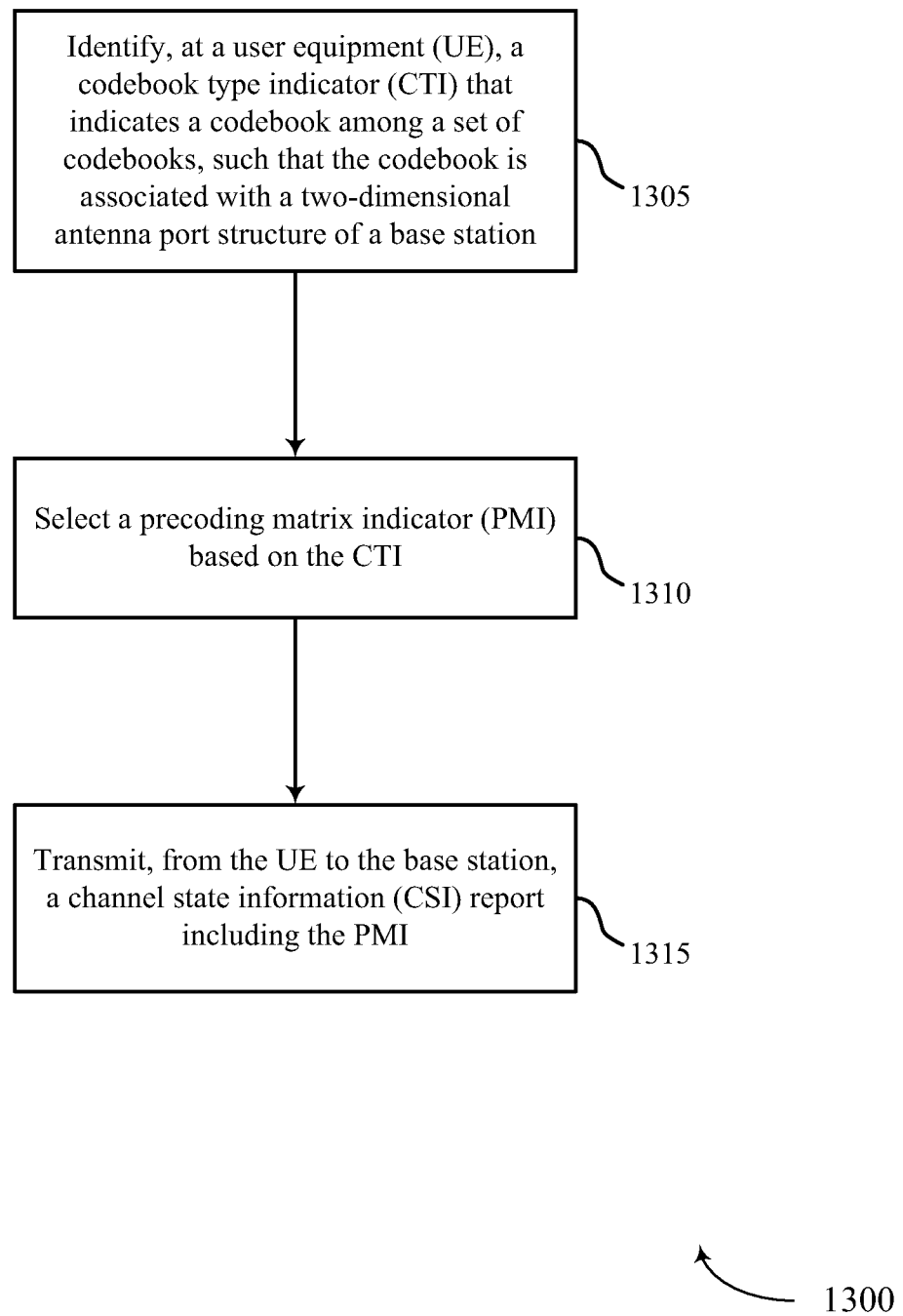
FIGS. 13-20 illustrate methods for CSI feedback signaling for elevation beamforming and FD-MIMO in accordance with various aspects of the present disclosure.

FIG. 13 shows a flowchart illustrating a method 1300 for CSI feedback signaling for elevation beamforming and FD-MIMO in accordance with various aspects of the present disclosure. The operations of method 1300 may be implemented by a UE 115 or its components as described with reference to FIGS. 1-12. For example, the operations of method 1300 may be performed by the CSI module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may identify, at a user equipment (UE), a codebook type indicator (CTI) that indicates a codebook among a set of codebooks, wherein the codebook is associated with a two-dimensional antenna port structure of a base station as described with reference to FIGS. 1-8. In certain examples, the operations of block 1305 may be performed by the codebook manager 1005 as described with reference to FIG. 10.

At block 1310, the UE 115 may select a precoding matrix indicator (PMI) based at least in part on the CTI as described with reference to FIGS. 1-8. In certain examples, the operations of block 1310 may be performed by the PMI selector 1010 as described with reference to FIG. 10.

At block 1315, the UE 115 may transmit, from the UE to the base station, a channel state information (CSI) report including the PMI as described with reference to FIGS. 1-8. In certain examples, the operations of block 1315 may be performed by the CSI reporting manager 1015 as described with reference to FIG. 10.

Figure 14:
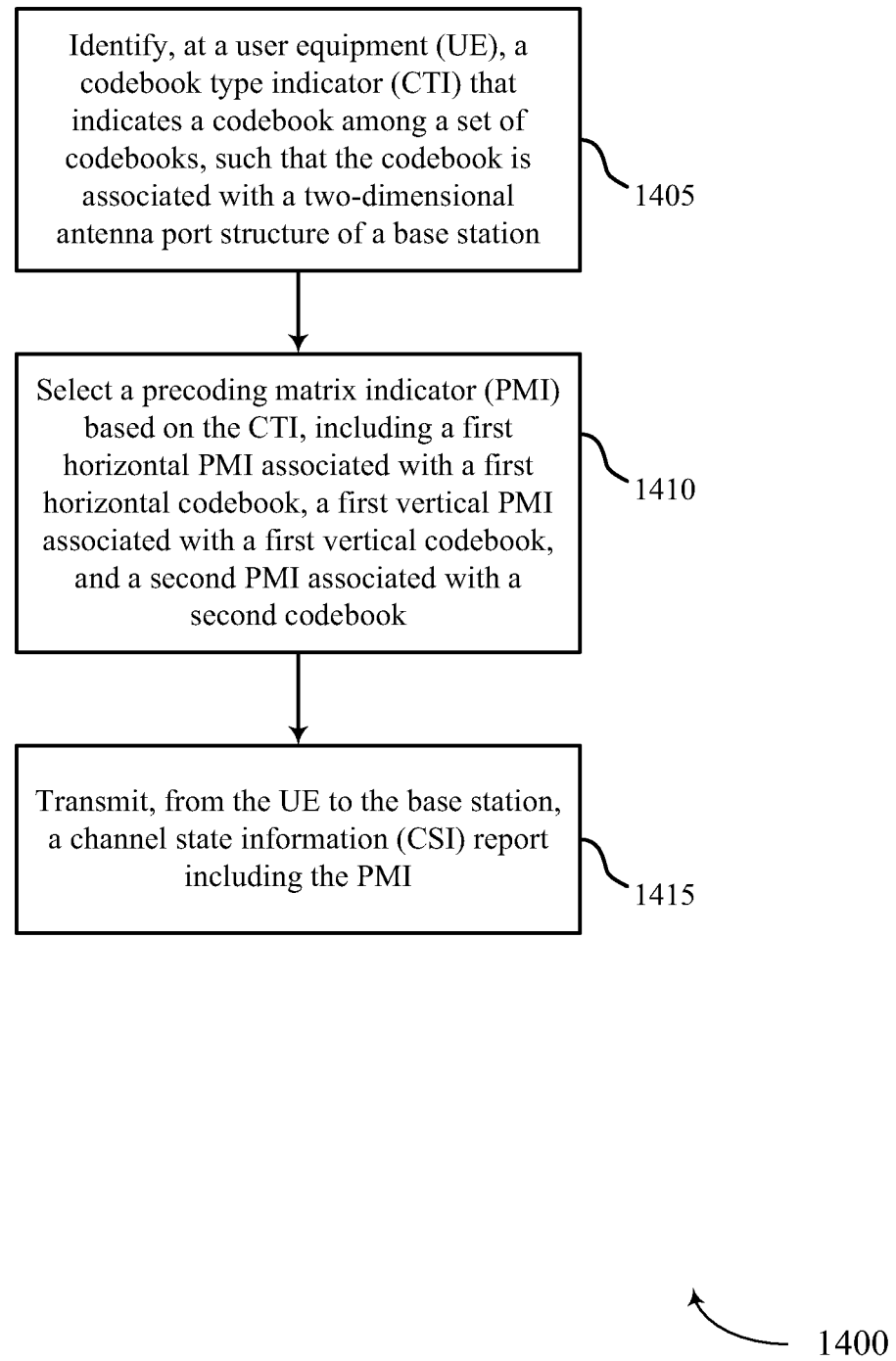

FIG. 14 shows a flowchart illustrating a method 1400 for CSI feedback signaling for elevation beamforming and FD-MIMO in accordance with various aspects of the present disclosure. The operations of method 1400 may be implemented by a UE 115 or its components as described with reference to FIGS. 1-12. For example, the operations of method 1400 may be performed by the CSI module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may identify, at a user equipment (UE), a codebook type indicator (CTI) that indicates a codebook among a set of codebooks, wherein the codebook is associated with a two-dimensional antenna port structure of a base station as described with reference to FIGS. 1-8. In certain examples, the operations of block 1405 may be performed by the codebook manager 1005 as described with reference to FIG. 10.

At block 1410, the UE 115 may select a precoding matrix indicator (PMI) based on the CTI, including a first horizontal PMI associated with a first horizontal codebook, a first vertical PMI associated with a first vertical codebook, and a second PMI associated with a second codebook as described with reference to FIGS. 1-8. In certain examples, the operations of block 1410 may be performed by the PMI selector 1010 as described with reference to FIG. 10.

At block 1415, the UE 115 may transmit, from the UE to the base station, a channel state information (CSI) report including the PMI as described with reference to FIGS. 1-8. In certain examples, the operations of block 1415 may be performed by the CSI reporting manager 1015 as described with reference to FIG. 10.

Figure 15:
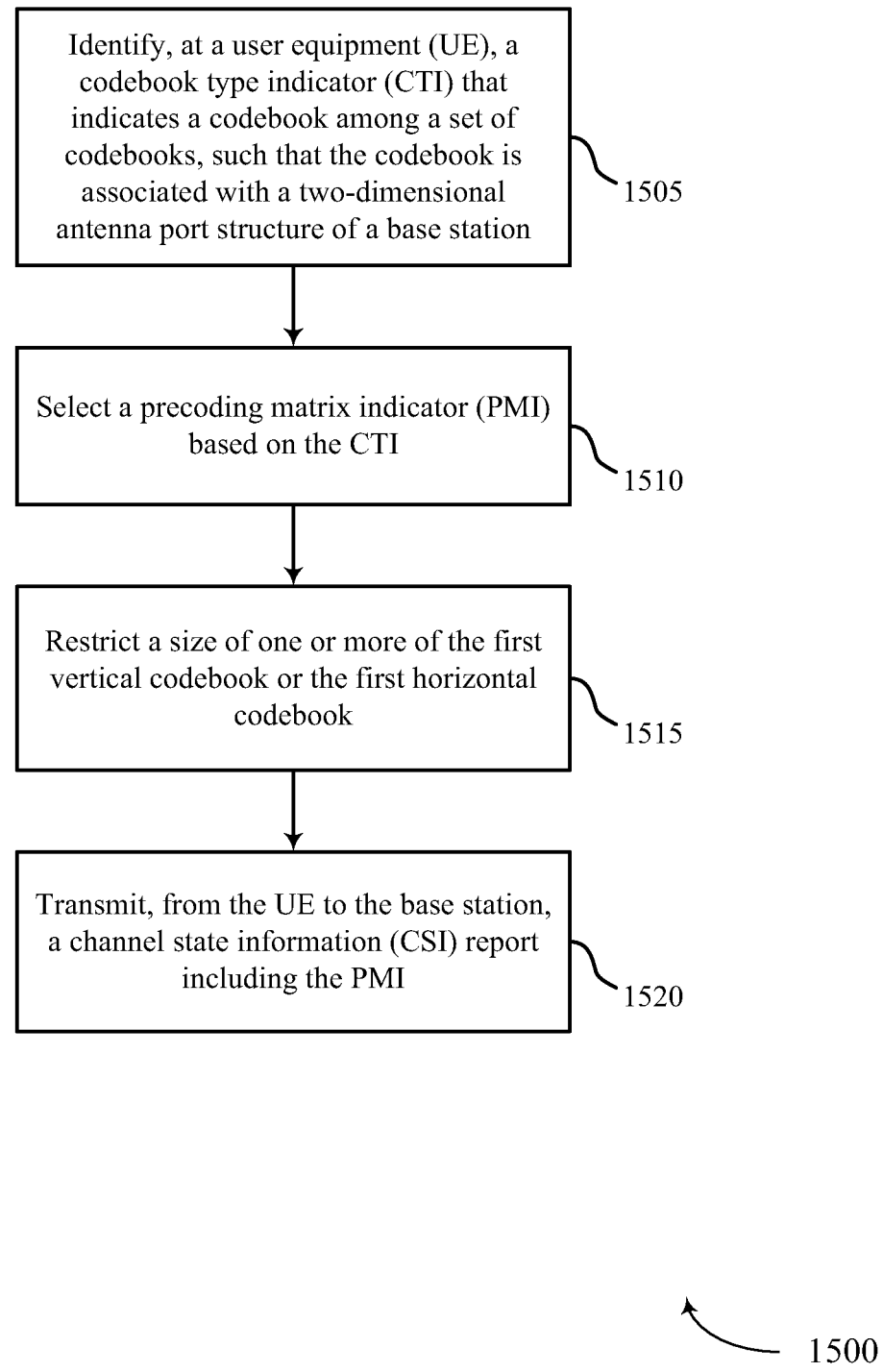

FIG. 15 shows a flowchart illustrating a method 1500 for CSI feedback signaling for elevation beamforming and FD-MIMO in accordance with various aspects of the present disclosure. The operations of method 1500 may be implemented by a UE 115 or its components as described with reference to FIGS. 1-12. For example, the operations of method 1500 may be performed by the CSI module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300, and 1400 of FIGS. 13-14.

At block 1505, the UE 115 may identify, at a user equipment (UE), a codebook type indicator (CTI) that indicates a codebook among a set of codebooks, wherein the codebook is associated with a two-dimensional antenna port structure of a base station as described with reference to FIGS. 1-8. In certain examples, the operations of block 1505 may be performed by the codebook manager 1005 as described with reference to FIG. 10. The codebook may include a first vertical codebook associated with a number of rows of the two-dimensional antenna port structure, and a first horizontal codebook associated with a number of columns of the two-dimensional antenna port structure.

At block 1510, the UE 115 may select a precoding matrix indicator (PMI) based on the CTI as described with reference to FIGS. 1-8. In certain examples, the operations of block 1510 may be performed by the PMI selector 1010 as described with reference to FIG. 10.

At block 1515, the UE 115 may restrict a size of one or more of the first vertical codebook or the first horizontal codebook as described with reference to FIGS. 1-8. In certain examples, the operations of block 1515 may be performed by the codebook manager 1005 as described with reference to FIG. 10.

At block 1520, the UE 115 may transmit, from the UE to the base station, a channel state information (CSI) report including the PMI as described with reference to FIGS. 1-8. In certain examples, the operations of block 1520 may be performed by the CSI reporting manager 1015 as described with reference to FIG. 10.

Figure 16:
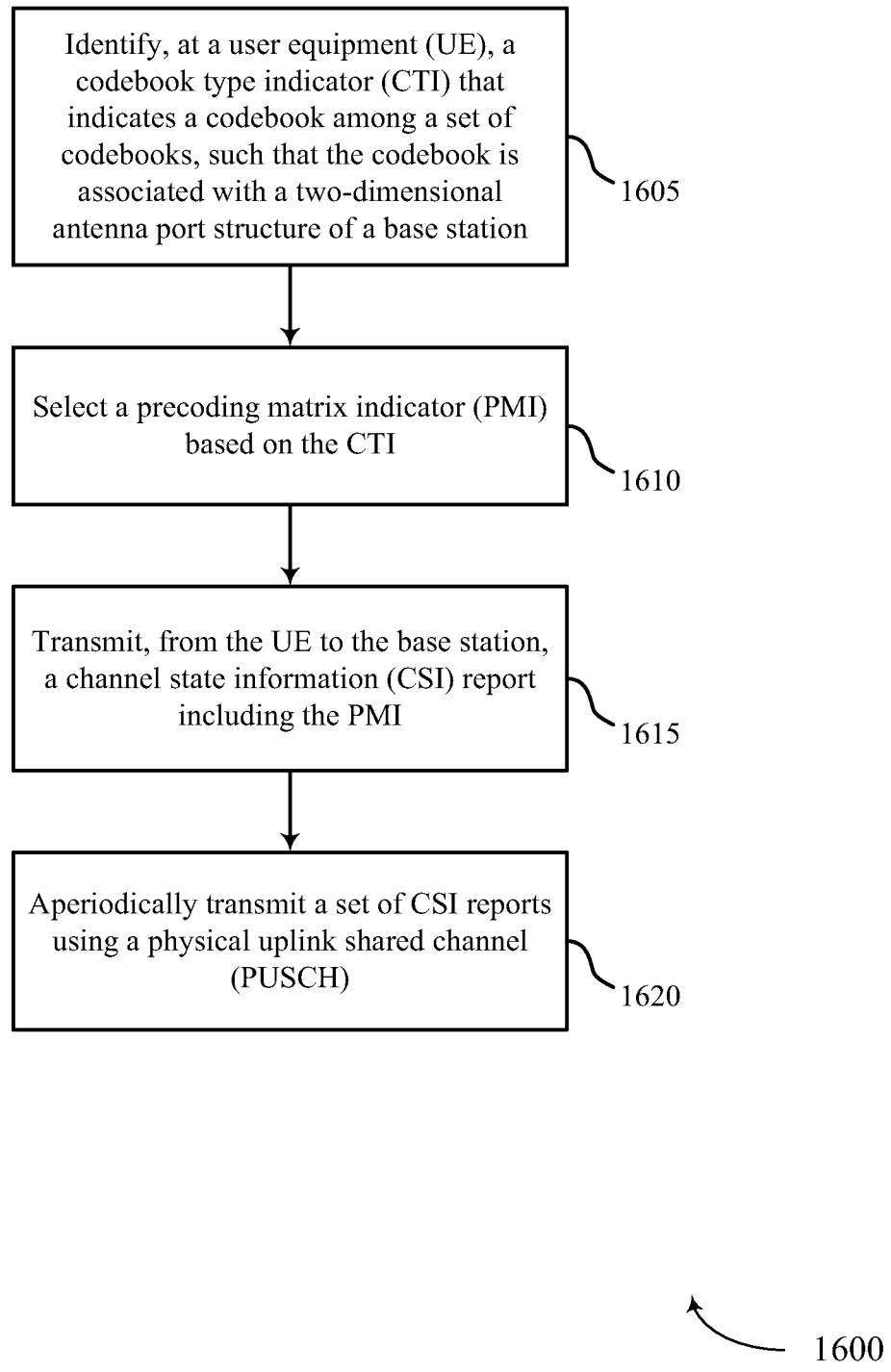

FIG. 16 shows a flowchart illustrating a method 1600 for CSI feedback signaling for elevation beamforming and FD-MIMO in accordance with various aspects of the present disclosure. The operations of method 1600 may be implemented by a UE 115 or its components as described with reference to FIGS. 1-12. For example, the operations of method 1600 may be performed by the CSI module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1300, 1400, and 1500 of FIGS. 13-15.

At block 1605, the UE 115 may identify, at a user equipment (UE), a codebook type indicator (CTI) that indicates a codebook among a set of codebooks, wherein the codebook is associated with a two-dimensional antenna port structure of a base station as described with reference to FIGS. 1-8. In certain examples, the operations of block 1605 may be performed by the codebook manager 1005 as described with reference to FIG. 10.

At block 1610, the UE 115 may select a precoding matrix indicator (PMI) based at least in part on the CTI as described with reference to FIGS. 1-8. In certain examples, the operations of block 1610 may be performed by the PMI selector 1010 as described with reference to FIG. 10.

At block 1615, the UE 115 may transmit, from the UE to the base station, a channel state information (CSI) report including the PMI as described with reference to FIGS. 1-8. In certain examples, the operations of block 1615 may be performed by the CSI reporting manager 1015 as described with reference to FIG. 10.

At block 1620, the UE 115 may aperiodically transmit a plurality of CSI reports using a physical uplink shared channel (PUSCH) as described with reference to FIGS. 1-8. In certain examples, the operations of block 1620 may be performed by the aperiodic CSI reporting manager 1105 as described with reference to FIG. 11.

Figure 17:
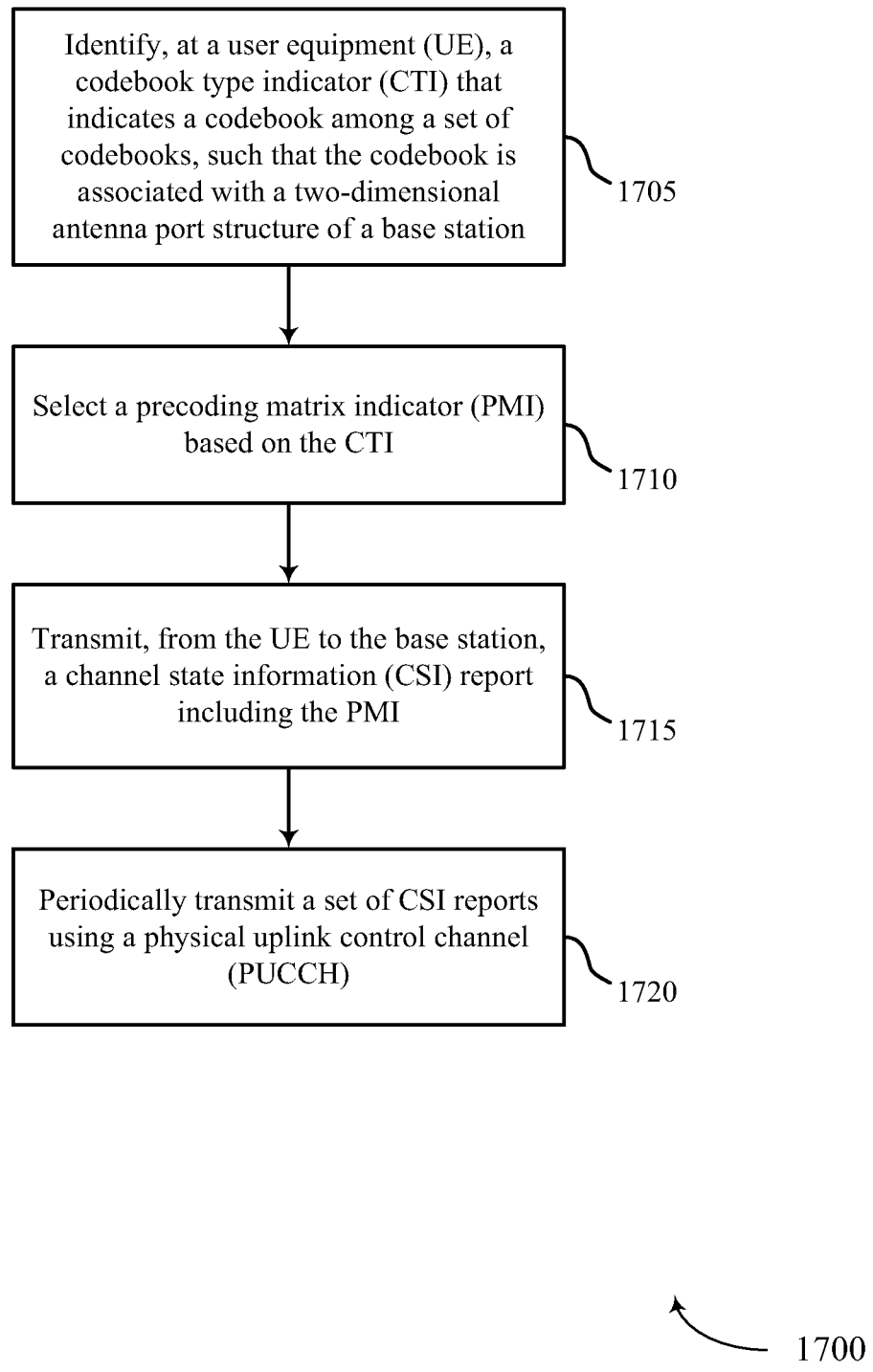

FIG. 17 shows a flowchart illustrating a method 1700 for CSI feedback signaling for elevation beamforming and FD-MIMO in accordance with various aspects of the present disclosure. The operations of method 1700 may be implemented by a UE 115 or its components as described with reference to FIGS. 1-12. For example, the operations of method 1700 may be performed by the CSI module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1300, 1400, 1500, and 1600 of FIGS. 13-16.

At block 1705, the UE 115 may identify, at a user equipment (UE), a codebook type indicator (CTI) that indicates a codebook among a set of codebooks, wherein the codebook is associated with a two-dimensional antenna port structure of a base station as described with reference to FIGS. 1-8. In certain examples, the operations of block 1705 may be performed by the codebook manager 1005 as described with reference to FIG. 10.

At block 1710, the UE 115 may select a precoding matrix indicator (PMI) based at least in part on the CTI as described with reference to FIGS. 1-8. In certain examples, the operations of block 1710 may be performed by the PMI selector 1010 as described with reference to FIG. 10.

At block 1715, the UE 115 may transmit, from the UE to the base station, a channel state information (CSI) report including the PMI as described with reference to FIGS. 1-8. In certain examples, the operations of block 1715 may be performed by the CSI reporting manager 1015 as described with reference to FIG. 10.

At block 1720, the UE 115 may periodically transmit a plurality of CSI reports using a physical uplink control channel (PUCCH) as described with reference to FIGS. 1-8. In certain examples, the operations of block 1720 may be performed by the periodic CSI reporting manager 1110 as described with reference to FIG. 11.

Figure 18:
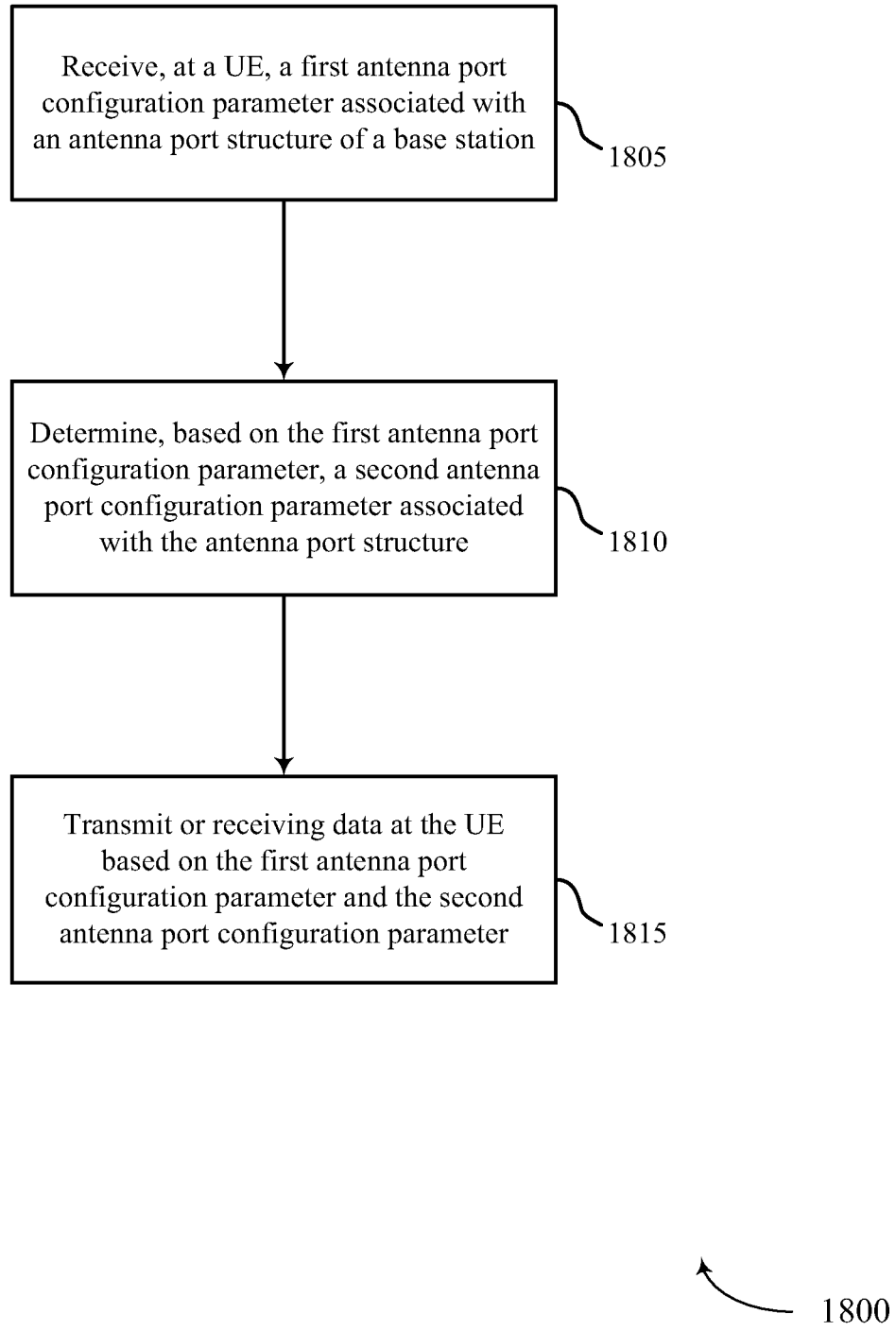

FIG. 18 shows a flowchart illustrating a method 1800 for CSI feedback signaling for elevation beamforming and FD-MIMO in accordance with various aspects of the present disclosure. The operations of method 1800 may be implemented by a UE 115 or its components as described with reference to FIGS. 1-12. For example, the operations of method 1800 may be performed by the CSI module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of methods 1300, 1400, 1500, 1600, and 1700 of FIGS. 13-17.

At block 1805, the UE 115 may receive, at a UE, a first antenna port configuration parameter associated with an antenna port structure of a base station as described with reference to FIGS. 2-8. In certain examples, the operations of block 1805 may be performed by the antenna configuration communication manager 1020 as described with reference to FIG. 10.

At block 1810, the UE 115 may determine, based at least in part on the first antenna port configuration parameter, a second antenna port configuration parameter associated with the antenna port structure as described with reference to FIGS. 2-8. In certain examples, the operations of block 1810 may be performed by the antenna port configuration manager 1025 as described with reference to FIG. 10.

At block 1815, the UE 115 may transmit or receiving data at the UE based at least in part on the first antenna port configuration parameter and the second antenna port configuration parameter as described with reference to FIGS. 2-8. In certain examples, the operations of block 1815 may be performed by the UE communication manager 1030 as described with reference to FIG. 10.

Figure 19:
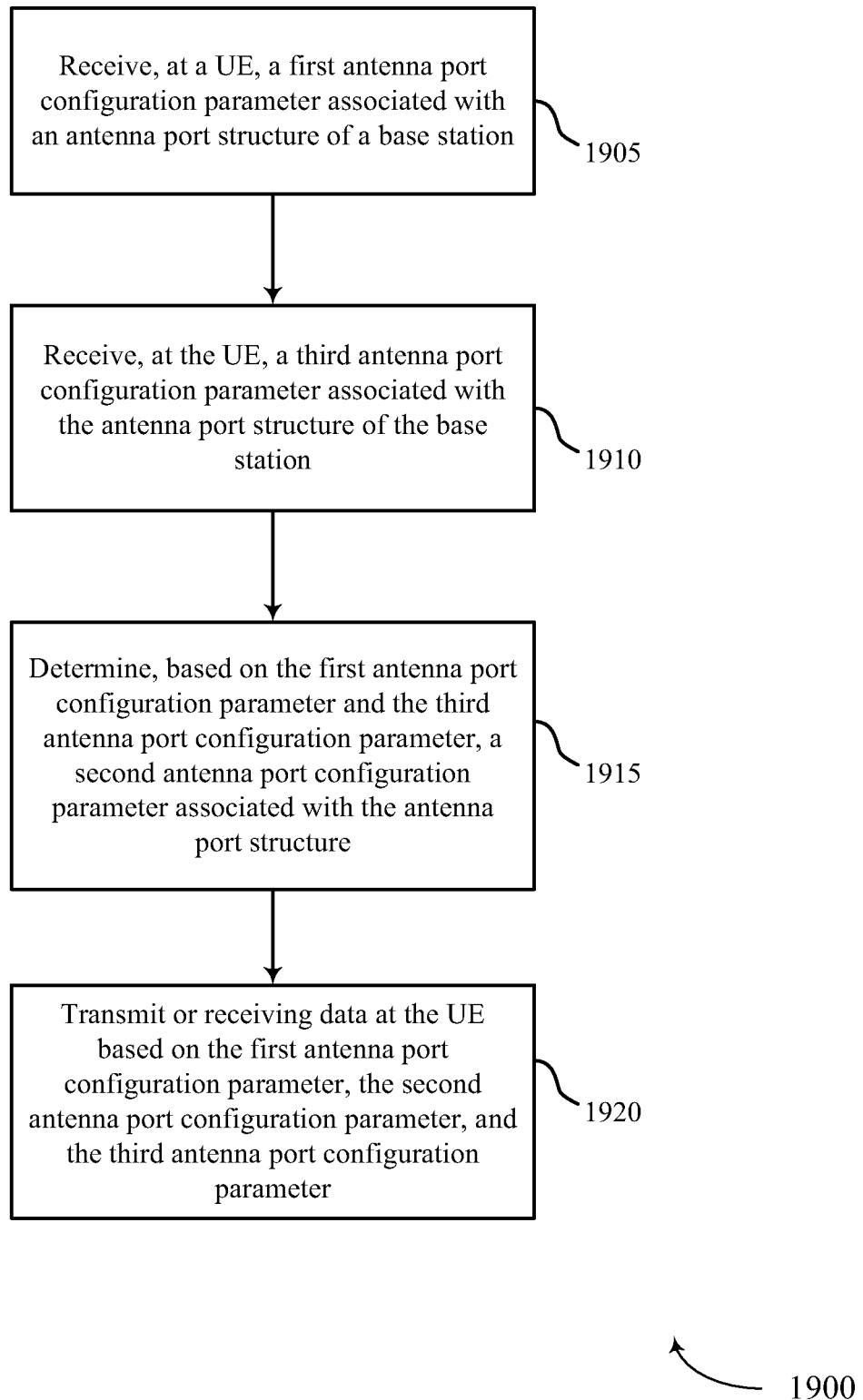

FIG. 19 shows a flowchart illustrating a method 1900 for CSI feedback signaling for elevation beamforming and FD-MIMO in accordance with various aspects of the present disclosure. The operations of method 1900 may be implemented by a UE 115 or its components as described with reference to FIGS. 1-12. For example, the operations of method 1900 may be performed by the CSI module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 1900 may also incorporate aspects of methods 1300, 1400, 1500, 1600, 1700, and 1800 of FIGS. 13-18.

At block 1905, the UE 115 may receive, at a UE, a first antenna port configuration parameter associated with an antenna port structure of a base station as described with reference to FIGS. 2-8. In certain examples, the operations of block 1905 may be performed by the antenna configuration communication manager 1020 as described with reference to FIG. 10.

At block 1910, the UE 115 may receive, at the UE, a third antenna port configuration parameter associated with the antenna port structure of the base station as described with reference to FIGS. 2-8. In certain examples, the operations of block 1910 may be performed by the antenna configuration communication manager 1020 as described with reference to FIG. 10.

At block 1915, the UE 115 may determine, based at least in part on the first antenna port configuration parameter and the third antenna port configuration parameter, a second antenna port configuration parameter associated with the antenna port structure as described with reference to FIGS. 2-8. In certain examples, the operations of block 1915 may be performed by the antenna port configuration manager 1025 as described with reference to FIG. 10.

At block 1920, the UE 115 may transmit or receiving data at the UE based at least in part on the first antenna port configuration parameter, the second antenna port configuration parameter, and the third antenna port configuration parameter as described with reference to FIGS. 2-8. In certain examples, the operations of block 1920 may be performed by the UE communication manager 1030 as described with reference to FIG. 10.

Figure 20:
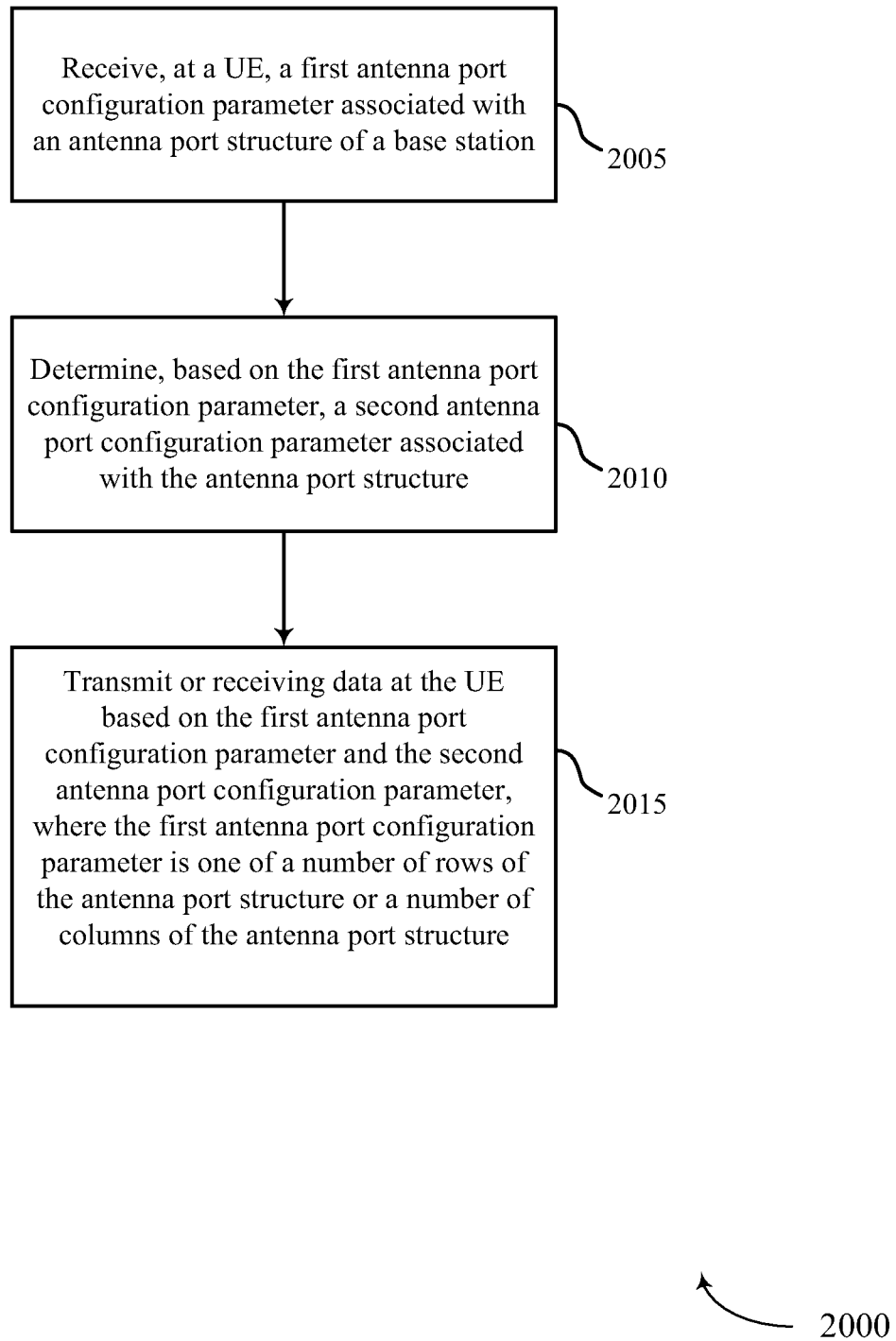

FIG. 20 shows a flowchart illustrating a method 2000 for CSI feedback signaling for elevation beamforming and FD-MIMO in accordance with various aspects of the present disclosure. The operations of method 2000 may be implemented by a UE 115 or its components as described with reference to FIGS. 1-12. For example, the operations of method 2000 may be performed by the CSI module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 2000 may also incorporate aspects of methods 1300, 1400, 1500, 1600, 1700, 1800, and 1900 of FIGS. 13-19.

At block 2005, the UE 115 may receive, at a UE, a first antenna port configuration parameter associated with an antenna port structure of a base station as described with reference to FIGS. 2-8. In certain examples, the operations of block 2005 may be performed by the antenna configuration communication manager 1020 as described with reference to FIG. 10.

At block 2010, the UE 115 may determine, based at least in part on the first antenna port configuration parameter, a second antenna port configuration parameter associated with the antenna port structure as described with reference to FIGS. 2-8. In certain examples, the operations of block 2010 may be performed by the antenna port configuration manager 1025 as described with reference to FIG. 10.

At block 2015, the UE 115 may transmit or receiving data at the UE based at least in part on the first antenna port configuration parameter and the second antenna port configuration parameter, where the first antenna port configuration parameter is one of a number of rows of the antenna port structure or a number of columns of the antenna port structure, as described with reference to FIGS. 2-8. In certain examples, the operations of block 2015 may be performed by the UE communication manager 1030 as described with reference to FIG. 10.

Thus, methods 1300, 1400, 1500, 1600, 1700, 1800, 1900, and 2000 may provide for CSI feedback signaling for elevation beamforming and FD-MIMO. It should be noted that methods 1300, 1400, 1500, 1600, 1700, 1800, 1900, and 2000 describe possible implementation, and that the operations and the steps may be rearranged or otherwise modified such that other implementations are possible. In some examples, aspects from two or more of the methods 1300, 1400, 1500, 1600, 1700, 1800, 1900, and 2000 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and Long Term Evolution (LTE)-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
receiving an antenna port configuration message, wherein the antenna port configuration message includes antenna port structure information;
receiving, from a network entity, a bitmap parameter comprising a bit sequence, wherein each bit of the bit sequence has a one-to-one correspondence with a pair of precoding matrix indicators (PMI) including a first PMI and a second PMI of a plurality of PMI associated with the antenna port structure information for a subset of codebooks, the bit sequence indicating whether PMI reporting is allowed on the subset of codebooks;
identifying, at a user equipment (UE), a codebook type indicator (CTI) that indicates a codebook among the subset of codebooks, wherein the CTI is based at least in part on one or more CTI values and the bitmap parameter, and wherein the codebook is associated with the antenna port structure information; and
selecting a PMI based at least in part on the CTI, the subset of codebooks, and the bitmap parameter, wherein selecting the PMI based at least in part on the CTI, the subset of codebooks, and the bitmap parameter comprises:
selecting the first PMI associated with a first codebook of the subset of codebooks, or selecting the second PMI associated with a second codebook of the subset of codebooks, or selecting a third PMI associated with a third codebook of the subset of codebooks, or a combination thereof, wherein one or more of selecting the first PMI, selecting the second PMI, or selecting the third PMI is based at least in part on the CTI, the subset of codebooks, and the bitmap parameter; and
transmitting, from the UE to the network entity, a channel state information (C SI) report including the PMI.

2. The method of claim 1, wherein the CSI report further includes the CTI.

3. The method of claim 1, wherein the codebook comprises:
a first vertical codebook associated with a quantity of rows of a two-dimensional antenna port structure; and
a first horizontal codebook associated with a quantity of columns of the two-dimensional antenna port structure.

4. The method of claim 3, wherein the codebook further comprises:
a second codebook associated with a quantity of polarizations of the two-dimensional antenna port structure.

5. The method of claim 1, wherein a first value at a bit of the bitmap parameter indicates that CSI reporting is allowed for a precoding matrix associated with the bit, and a second value at the bit indicates that CSI reporting is not allowed for the precoding matrix associated with the bit.

6. The method of claim 1, wherein selecting the PMI is further based at least in part on a rank indicator (RI).

7. The method of claim 1, further comprising:
aperiodically transmitting a plurality of CSI reports using a physical uplink shared channel (PUSCH).

8. The method of claim 7, wherein aperiodically transmitting the plurality of CSI reports using the PUSCH comprises:
aperiodically transmitting the CTI, a rank indicator (RI), a first vertical PMI, a first horizontal PMI, and a channel quality indicator (CQI).

9. The method of claim 1, further comprising:
periodically transmitting a plurality of CSI reports using a physical uplink control channel (PUCCH).

10. The method of claim 9, wherein periodically transmitting the plurality of CSI reports using the PUCCH comprises:
transmitting, with a first periodicity, a first CSI report encoding a rank indicator (RI) and a first vertical PMI;
transmitting, with a second periodicity, a second CSI report encoding a first horizontal PMI; and
transmitting, with a third periodicity, a third CSI report encoding a wideband channel quality indicator (CQI) and the second PMI.

11. The method of claim 9, wherein periodically transmitting the plurality of CSI reports using the PUCCH comprises:
transmitting, with a first periodicity, a first CSI report encoding a rank indicator (RI) and a precoding type indicator (PTI);
transmitting, with a second periodicity, a second CSI report encoding one of a first vertical PMI or a first horizontal PMI based at least in part on the PTI; and
transmitting, with a third periodicity, a third CSI report encoding a wideband channel quality indicator (CQI), a second PMI, and one of the first horizontal PMI or the first vertical PMI based at least in part on the PTI.

12. The method of claim 9, wherein periodically transmitting the plurality of CSI reports using the PUCCH comprises:
transmitting, with a first periodicity, a first CSI report encoding a rank indicator (RI) and a precoding type indicator (PTI);
transmitting, with a second periodicity, a second CSI report encoding, based at least in part on the PTI, one of a combined first horizontal PMI and first vertical PMI or a combined wideband channel quality indicator (CQI) and the second PMI; and
transmitting, at a third periodicity, a third CSI report encoding, based at least in part on the PTI, one of a combined wideband CQI and the second PMI or a combined subband CQI and the second PMI.

13. The method of claim 9, wherein transmitting the plurality of CSI reports comprises:
detecting a collision between a CSI report associated with the network entity and a second CSI report;
determining that a first priority associated with the CSI report is higher than a second priority associated with the second CSI report;
dropping the second CSI report; and
transmitting, from the UE to the network entity, the CSI report including the PMI.

14. The method of claim 1, wherein selecting the PMI based at least in part on the CTI comprises:
selecting a first vertical PMI associated with a first vertical codebook of the one or more codebook values, or selecting a first horizontal PMI associated with a first horizontal codebook of the one or more codebook values, or selecting the second PMI associated with the second codebook of the one or more codebook values, or a combination thereof, wherein one or more of selecting the first vertical PMI, selecting the first horizontal PMI, or selecting the second PMI is based at least in part on the CTI.

15. An apparatus for wireless communication, comprising:
means for receiving an antenna port configuration message, wherein the antenna port configuration message includes antenna port structure information;
means for receiving, from a network entity, a bitmap parameter comprising a bit sequence, wherein each bit of the bit sequence has a one-to-one correspondence with a pair of a precoding matrix indicators (PMI) including a first PMI and a second PMI of a plurality of PMI associated with the antenna port structure information for a subset of codebooks, the bit sequence indicating whether PMI reporting is allowed on the subset of codebooks;

means for identifying, at a user equipment (UE), a codebook type indicator (CTI) that indicates a codebook among the subset of codebooks, wherein the CTI is based at least in part on one or more CTI values and the bitmap parameter, and wherein the codebook is associated with the antenna port structure information;

means for selecting a PMI based at least in part on the CTI, the subset of codebooks, and the bitmap parameter, wherein selecting the PMI based at least in part on the CTI, the subset of codebooks, and the bitmap parameter comprises selecting the first PMI associated with a first codebook of the subset of codebooks, or selecting the second PMI associated with a second codebook of the subset of codebooks, or selecting a third PMI associated with a third codebook of the subset of codebooks, or a combination thereof, wherein one or more of selecting the first PMI, selecting the second PMI, or selecting the third PMI is based at least in part on the CTI, the subset of codebooks, and the bitmap parameter; and means for transmitting, from the UE to the network entity, a channel state information (CSI) report including the PMI.

16. The apparatus of claim 15, wherein the CSI report further includes the CTI.

17. The apparatus of claim 15, further comprising: means for aperiodically transmitting a plurality of CSI reports using a physical uplink shared channel (PUSCH).

18. The apparatus of claim 15, further comprising: means for periodically transmitting a plurality of CSI reports using a physical uplink control channel (PUCCH).

19. An apparatus for wireless communication, comprising:
a processor; and
memory coupled with the processor, the processor configured to:
receive an antenna port configuration message, wherein the antenna port configuration message includes antenna port structure information;
receive, from a network entity, a bitmap parameter comprising a bit sequence, wherein each bit of the bit sequence has a one-to-one correspondence with a pair of precoding matrix indicators (PMI) including a first PMI and a second PMI of a plurality of PMI associated with the antenna port structure information for a subset of codebooks, the bit sequence indicating whether PMI reporting is allowed on the subset of codebooks;
identify a codebook type indicator (CTI) that indicates a codebook among the subset of codebooks, wherein the CTI is based at least in part on one or more CTI values and the bitmap parameter, and wherein the codebook is associated with the antenna port structure information;
select a PMI based at least in part on the CTI, the subset of codebooks, and the bitmap parameter, wherein the PMI is selected based at least in part on the CTI, the subset of codebooks, and the bitmap parameter such that the first PMI associated with a first codebook of the subset of codebooks is selected, or the second PMI associated with a second codebook of the subset of codebooks is selected, or a third PMI associated with a third codebook of the subset of codebooks is selected, or a combination thereof, wherein one or more of the selected first PMI, the selected second PMI, or the selected third PMI is based at least in part on the CTI, the subset of codebooks, and the bitmap parameter; and
transmit a channel state information (C SI) report including the PMI.

20. The apparatus of claim 19, wherein the CSI report further includes the CTI.

21. The apparatus of claim 19, wherein the codebook comprises:
a first vertical codebook associated with a quantity of rows of a two-dimensional antenna port structure; and
a first horizontal codebook associated with a quantity of columns of the two-dimensional antenna port structure.

22. The apparatus of claim 21, wherein the codebook further comprises:
a second codebook associated with a quantity of polarizations of the two-dimensional antenna port structure.

23. The apparatus of claim 19, wherein a first value at a bit of the bitmap parameter indicates that CSI reporting is allowed for a precoding matrix associated with the bit, and a second value at the bit indicates that CSI reporting is not allowed for the precoding matrix associated with the bit.

24. The apparatus of claim 19, wherein selecting the PMI is further based at least in part on a rank indicator (RI).

25. A non-transitory computer-readable medium storing code for communication, the code comprising instructions executable by a processor to:
receive an antenna port configuration message, wherein the antenna port configuration message includes antenna port structure information;
receive, from a network entity, a bitmap parameter comprising a bit sequence, wherein each bit of the bit sequence includes has a one-to-one correspondence with a pair of precoding matrix indicators (PMI) including a first PMI and a second PMI of a plurality of PMI associated with the antenna port structure information for a subset of codebooks, the bit sequence indicating whether PMI reporting is allowed on the subset of codebooks;
identify a codebook type indicator (CTI) that indicates a codebook among the subset of codebooks, wherein the CTI is based at least in part on one or more CTI values and the bitmap parameter, and wherein the codebook is associated with the antenna port structure information;
select a PMI based at least in part on the CTI, the subset of codebooks, and the bitmap parameter, wherein the PMI is selected based at least in part on the CTI, the subset of codebooks, and the bitmap parameter such that the first PMI associated with a first codebook of the subset of codebooks is selected, or the second PMI associated with a second codebook of the subset of codebooks is selected, or a third PMI associated with a third codebook of the subset of codebooks is selected, or a combination thereof, wherein one or more of the selected first PMI, the selected second PMI, or the selected third PMI is based at least in part on the CTI, the subset of codebooks, and the bitmap parameter; and
transmit a channel state information (C SI) report including the PMI.

26. The non-transitory computer-readable medium of claim 25, wherein the CSI report further includes the CTI.

* * * * *